United States Patent
Kuraoka

(10) Patent No.: US 8,787,133 B2
(45) Date of Patent: Jul. 22, 2014

(54) RECORDING APPARATUS, RECORDING METHOD, AND SPARING DESTINATION SELECTING METHOD

(71) Applicant: Sony Corporation, Tokyo (JP)

(72) Inventor: Tomotaka Kuraoka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/917,698

(22) Filed: Jun. 14, 2013

(65) Prior Publication Data
US 2013/0343169 A1 Dec. 26, 2013

(30) Foreign Application Priority Data
Jun. 22, 2012 (JP) .................. 2012-140792

(51) Int. Cl.
*G11B 7/00* (2006.01)
*G11C 29/00* (2006.01)

(52) U.S. Cl.
USPC ........................................ 369/53.15; 714/710

(58) Field of Classification Search
None
See application file for complete search history.

(56) References Cited

U.S. PATENT DOCUMENTS

| | | | | |
|---|---|---|---|---|
| 7,184,377 B2* | 2/2007 | Ito et al. | ...................... | 369/47.14 |
| 7,672,204 B2* | 3/2010 | Park et al. | .................. | 369/47.14 |
| 2003/0137909 A1* | 7/2003 | Ito et al. | ...................... | 369/47.14 |
| 2005/0018572 A1* | 1/2005 | Gushima et al. | ........... | 369/53.15 |
| 2005/0175323 A1* | 8/2005 | Hoshizawa | .................... | 386/125 |
| 2006/0230325 A1* | 10/2006 | Motohashi | .................... | 714/710 |
| 2008/0212431 A1* | 9/2008 | Nakamura | .................. | 369/53.17 |
| 2009/0092013 A1* | 4/2009 | Nishimura | ................. | 369/47.14 |
| 2013/0343168 A1 | 12/2013 | Kuraoka | | |
| 2013/0343169 A1* | 12/2013 | Kuraoka | .................... | 369/44.26 |

FOREIGN PATENT DOCUMENTS

JP 2009-123331 A 6/2009

OTHER PUBLICATIONS

Osta.Org "Universal Disk Format Specification" Revision 2.50, Apr. 30, 2003, 165 pages.

* cited by examiner

*Primary Examiner* — Peter Vincent Agustin
(74) *Attorney, Agent, or Firm* — Wolf, Greenfield & Sacks, P.C.

(57) ABSTRACT

A recording apparatus includes: a recording unit to record information by laser irradiation on a recording medium having multiple recording layers where information is recorded, with a track formed in the layers as a continuous recording area and data recorded within a track, and also multiple tracks set to one layer according to recording purpose; and a control unit to determine a sparing destination where information is recorded on a recording position specified according to a recording request, and if sparing processing occurs, as a first priority the next recording address of a track being recorded is selected as a sparing destination, and as a second priority the next recording address of a track overlapped with a track where recording is performed according to the recording request in a layering direction of the layers is selected as a sparing destination, and to cause the recording unit to execute sparing recording.

7 Claims, 22 Drawing Sheets

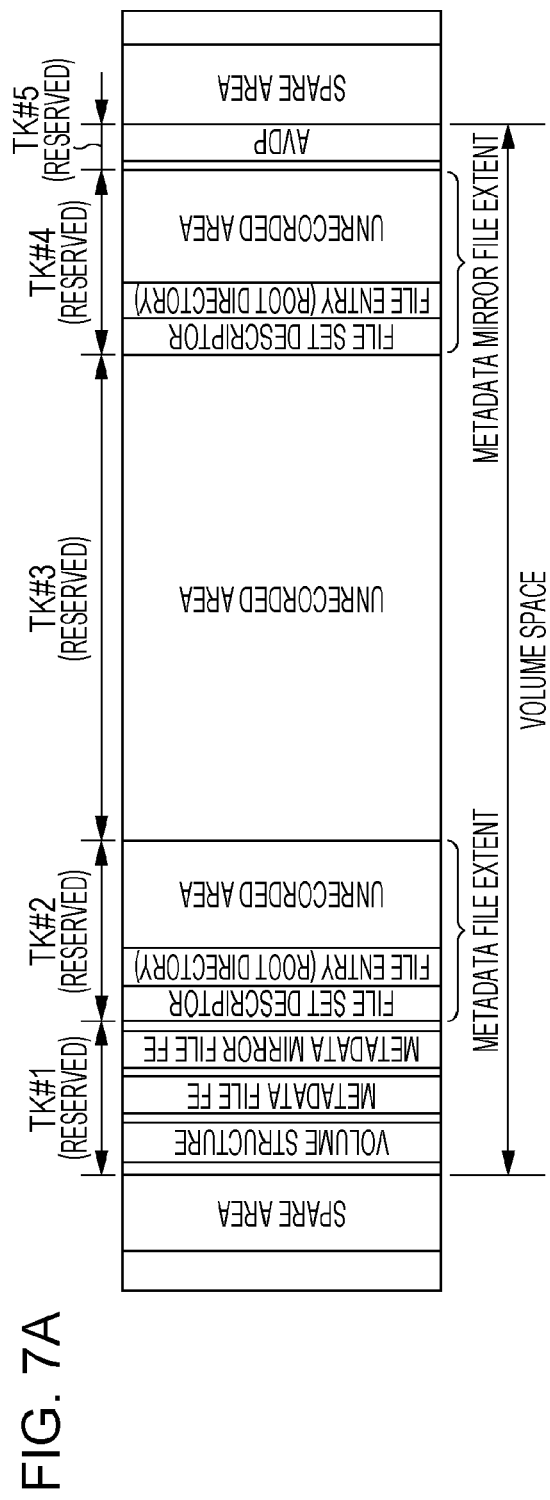
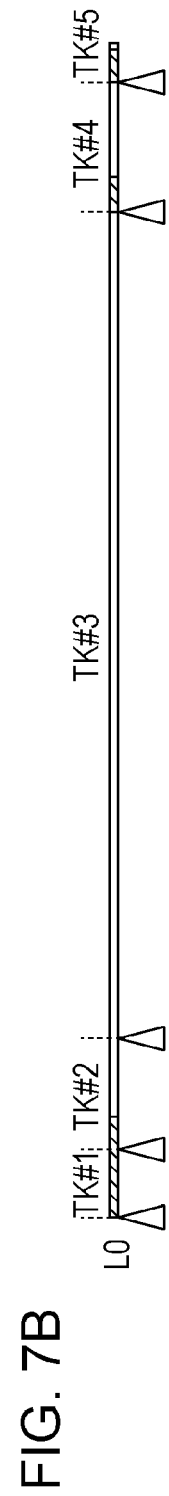
FIG. 7A
FIG. 7B

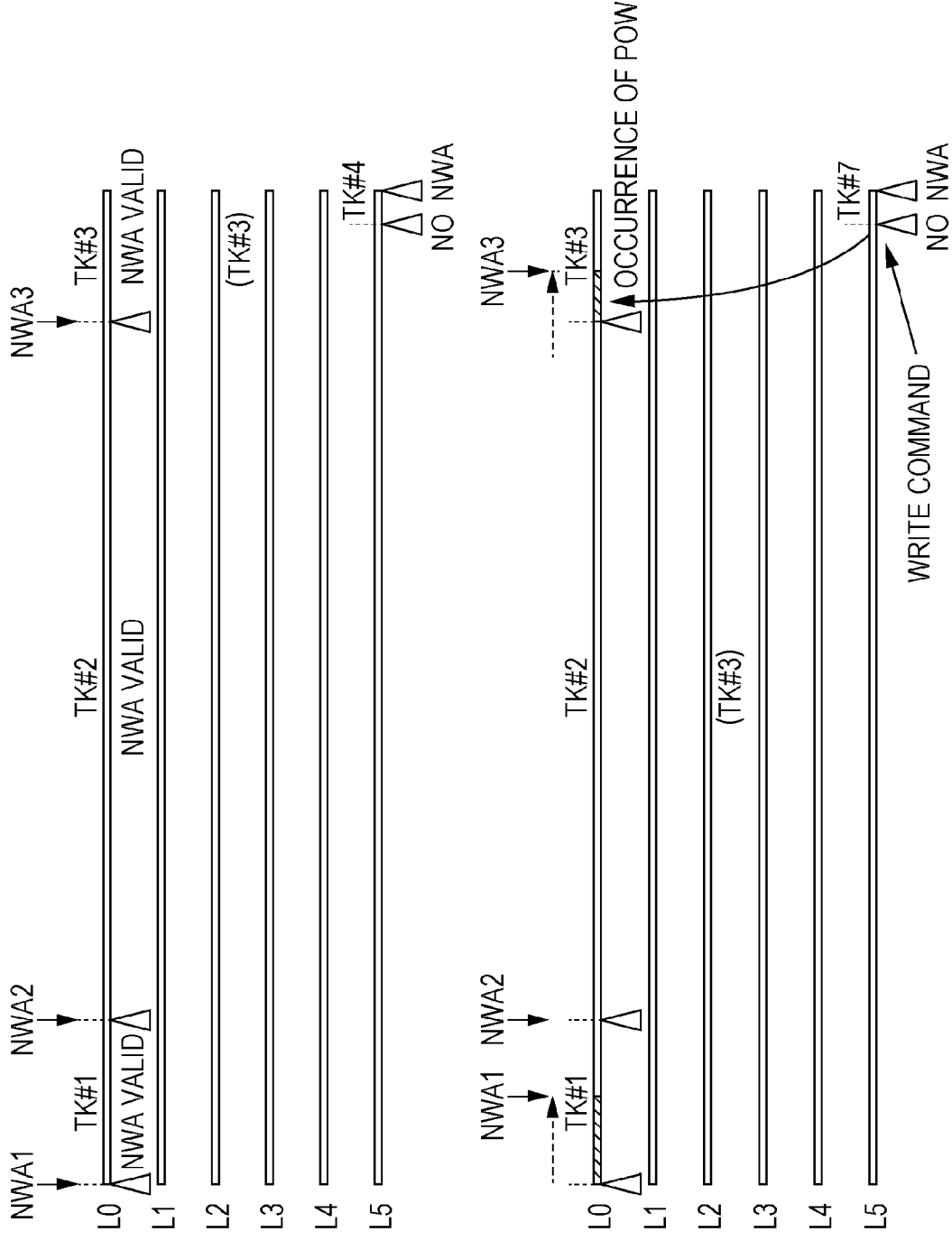

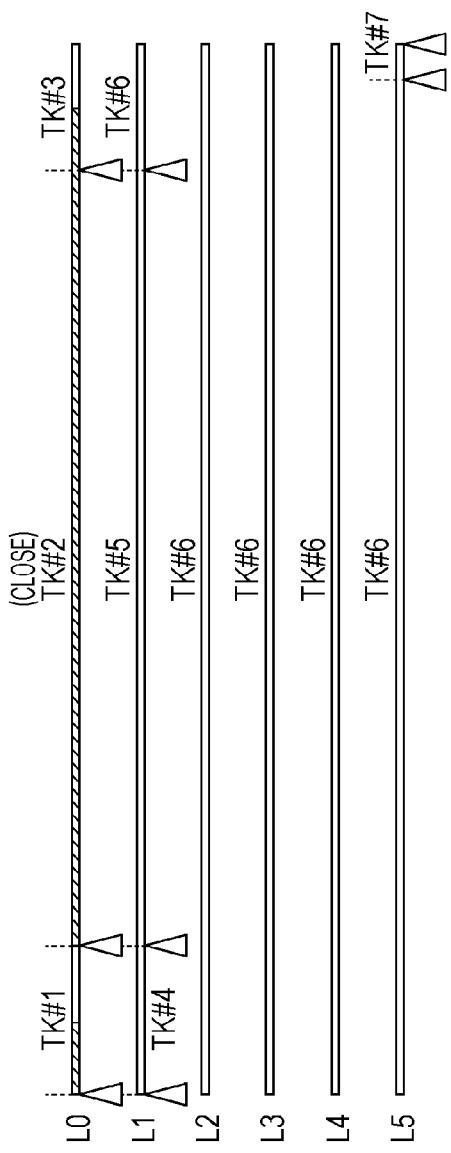
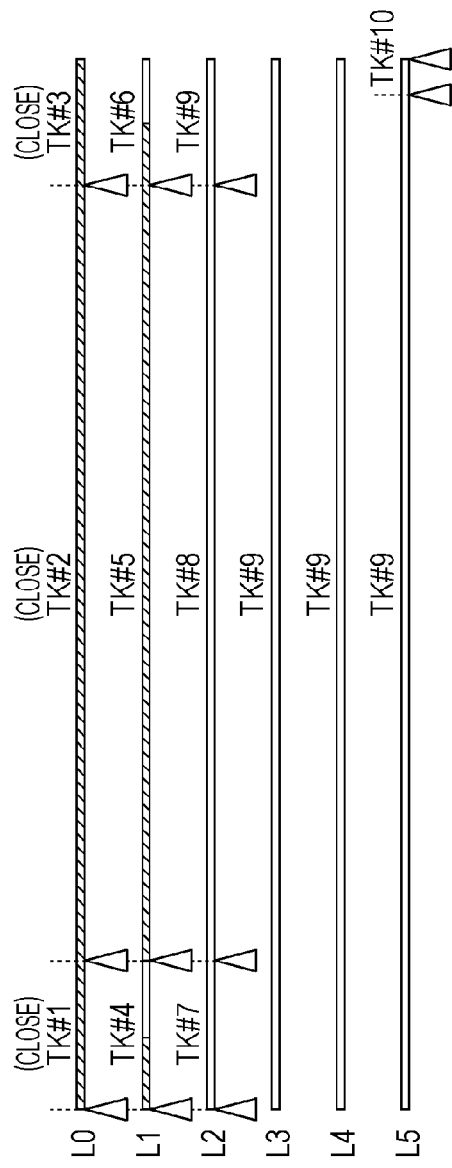
FIG. 11A
FIG. 11B

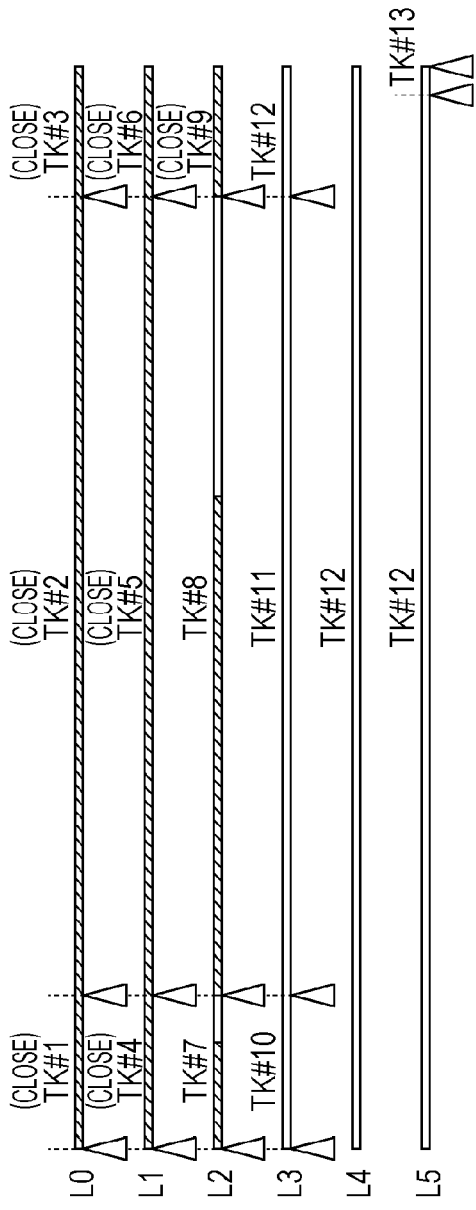
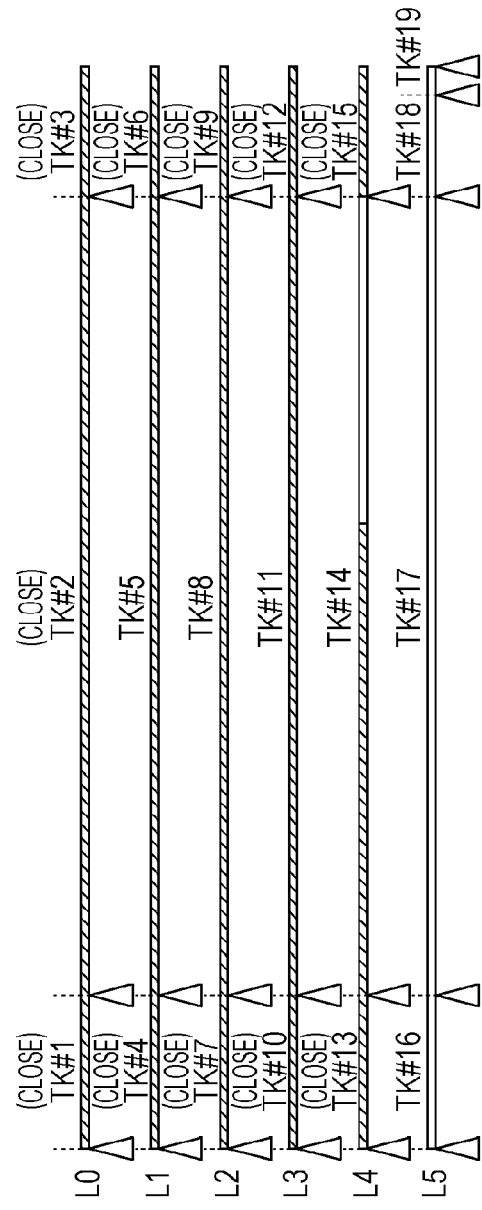
FIG. 12A
FIG. 12B

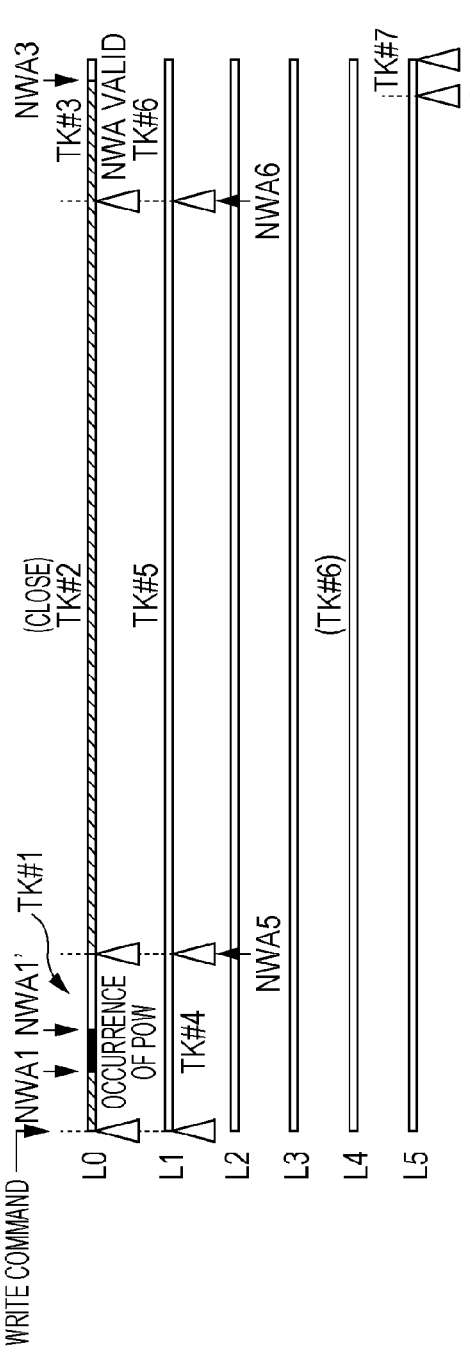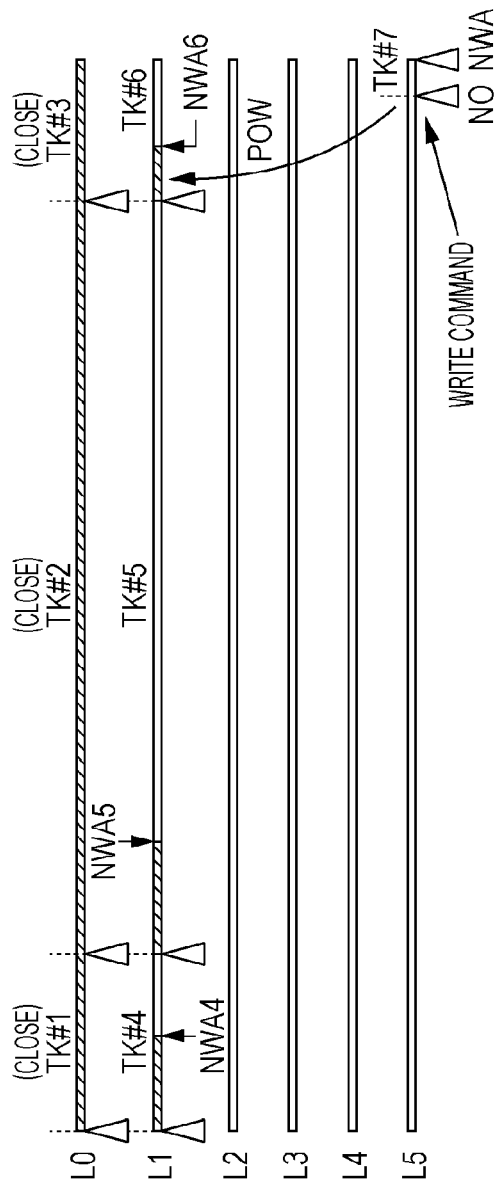

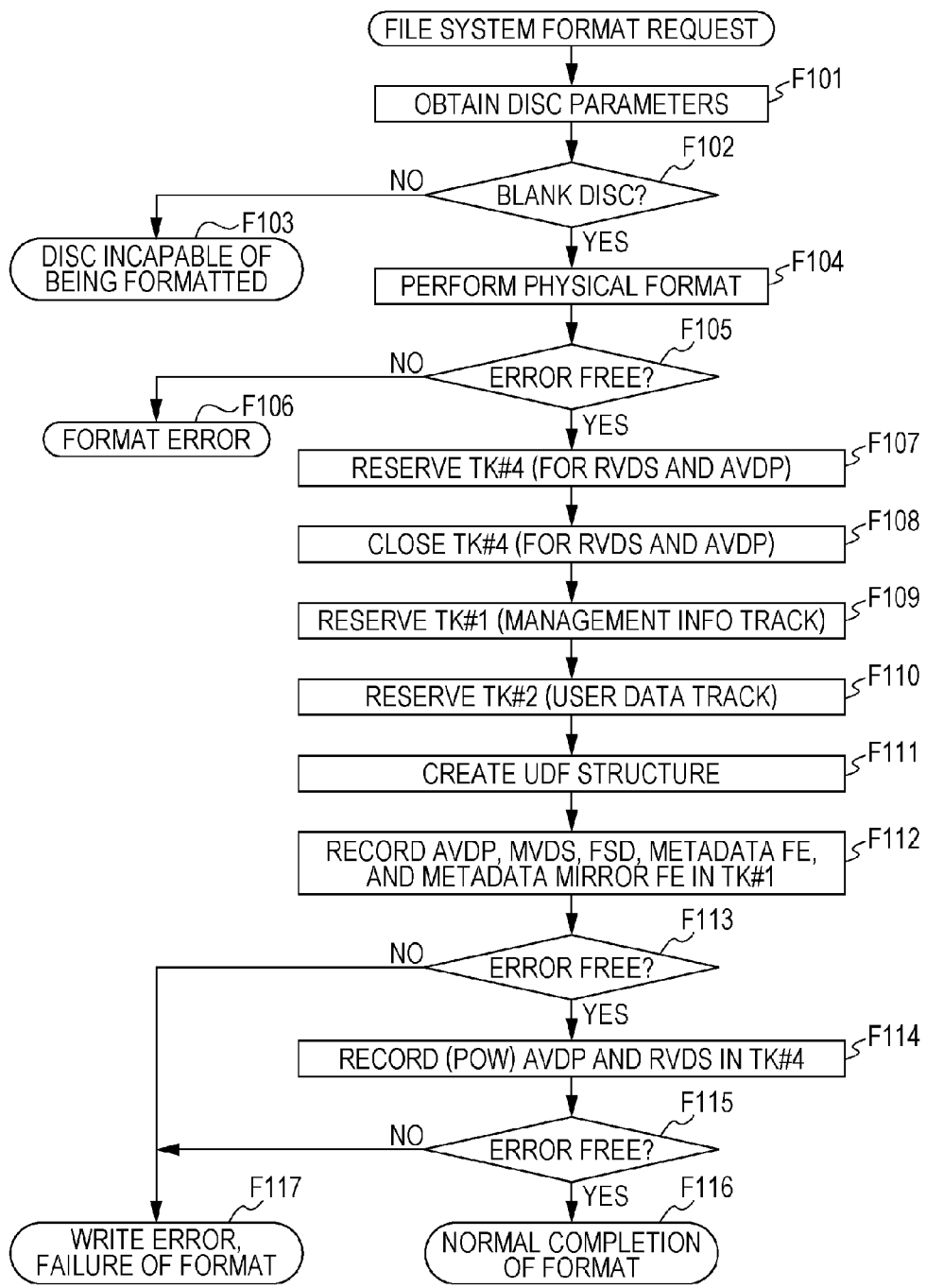

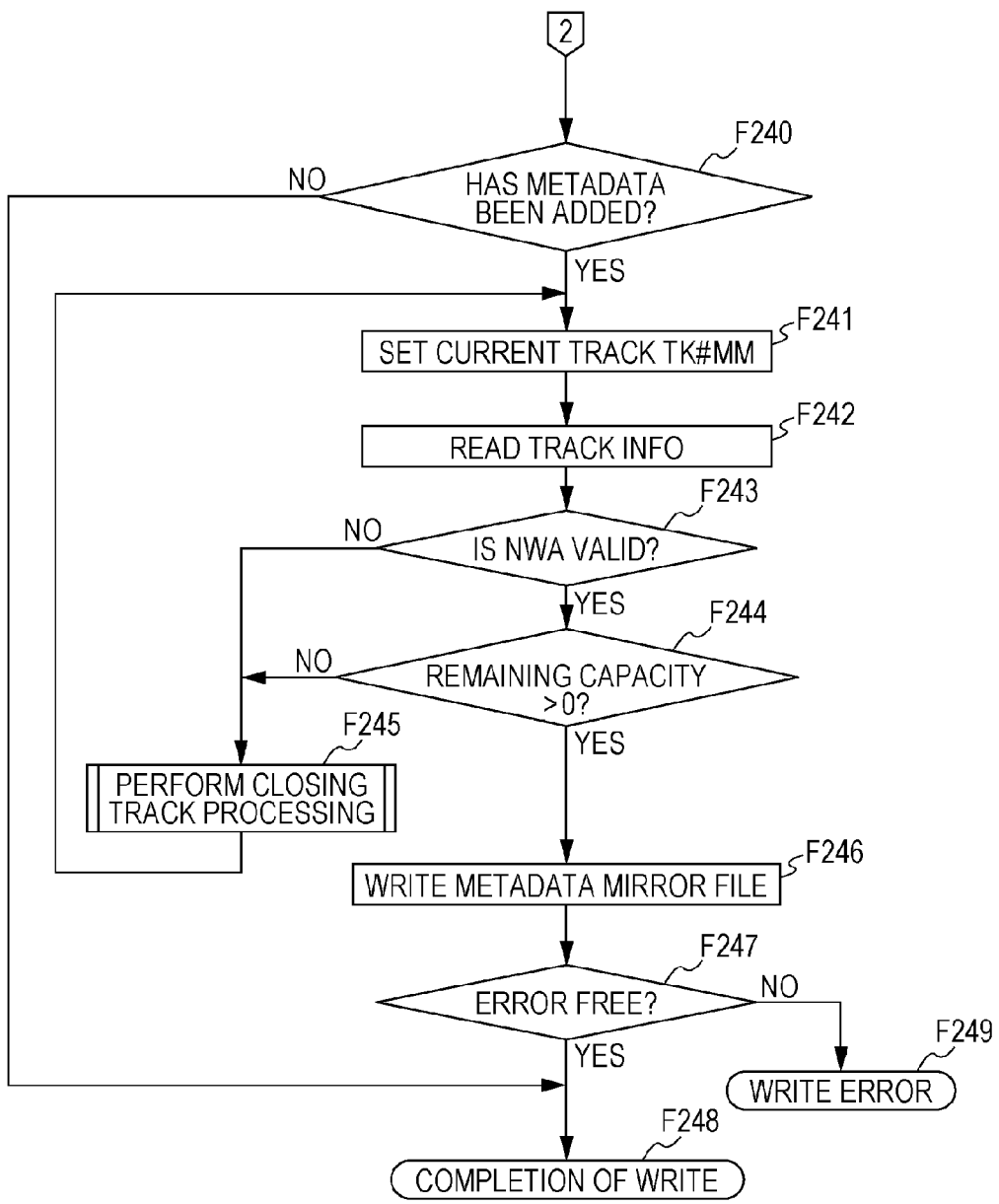

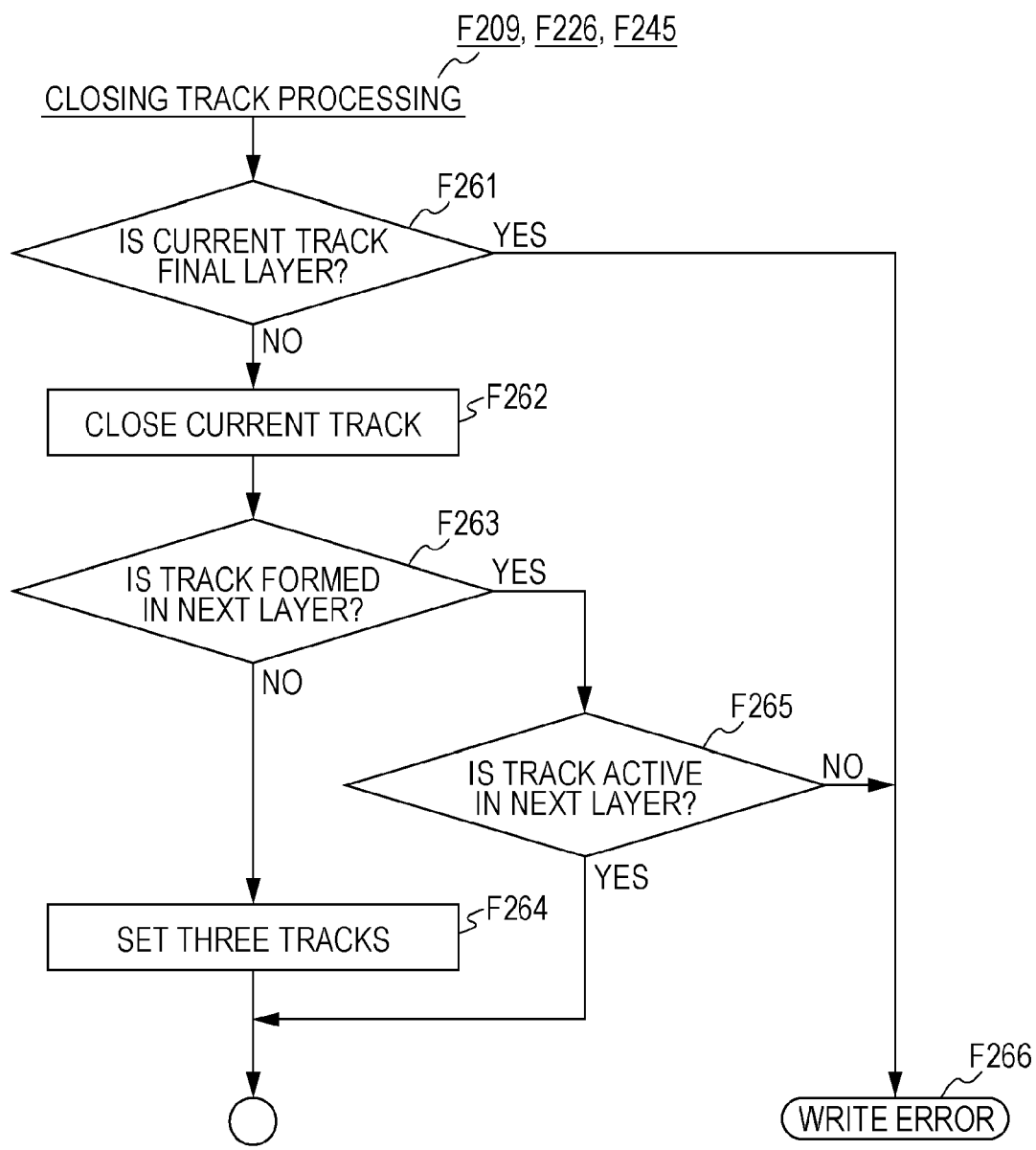

RECORDING APPARATUS, RECORDING METHOD, AND SPARING DESTINATION SELECTING METHOD

BACKGROUND

The present disclosure relates to a recording apparatus, a recording method, a sparing destination selecting method for a multilayer recording medium where multiple layers serving as recording layers are provided.

Examples of the related art of the present disclosure include Japanese Unexamined Patent Application Publication No. 2009-123331.

So-called optical disc recording media (hereinafter, also simply referred to as optical disc), such as CD (Compact Disc), DVD (Digital Versatile Disc), BD (Blu-ray Disc (registered trademark)) and so forth, for example, have come into widespread use as optical recording media where recording or playing of signals is performed by irradiation of light.

Heretofore, with regard to optical discs, large recording capacity has been achieved by realizing improvement in information recording density thereof. Specifically, there have been employed a technique for improving recording density in a direction where a formation pitch of tracks serving as pit rows or mark rows is narrowed, that is, in a radial direction, and a technique for improving recording density in a linear direction (direction orthogonal to a radial direction) by reduction in size of pits or marks. On the other hand, when realizing large recording capacity, a technique for increasing the number of recording layers (layers) is also effective, and multilayer discs such as 2-layer discs or 3 or more layer discs have been proposed and put into practical use under present circumstances.

SUMMARY

Incidentally, in the case of a multilayer disc, a layer disposed in the back as viewed from the laser entry face side is influenced by the recorded state of a layer on the front side. That is to say, at the time of recording in a certain layer, it is not desirable that a layer on the front side where a laser beam passes through has been recorded. In the event that a layer on the front side has been recorded, suitable recording as to an area of a layer to the back side that is overlapped by a recorded area of a layer to the front side may not be executed, depending on disc types. Also, with multilayer discs, there is also demand for effectively managing tracks (continuous recording areas) where user data and management information are recorded, and also improving reliability and operation performance. Also, particularly, in the event that there is a defect area on an optical disc, or in the event of performing writing of data with a write-once medium, recording of information is performed in a position different from a position specified by a writing request after sparing processing is performed. Even with such sparing processing, it is desirable to enable effective recording and information management. Therefore, with the present disclosure, a technique of sparing processing for realizing improvement in reliability and operation performance will be proposed.

A recording apparatus according to the present disclosure includes: a recording unit configured to perform recording of information by laser irradiation on a recording medium having a plurality of layers serving as recording layers where recording of information is performed by laser irradiation, and a track serving as a continuous recording area is formed in the plurality of layers, and recording of data is performed within a track, and also a plurality of tracks are set to one layer according to recording purpose; and a control unit configured to determine a sparing destination by sparing destination selecting processing where recording of information by the recording unit is executed on a recording position on the recording medium specified according to a recording request, and also in the event that sparing processing occurs, as a first priority the next recording address of a track being recorded is selected as a sparing destination, and as a second priority the next recording address of a track overlapped with a track where recording is performed according to the recording request in a layering direction of the layers is selected as a sparing destination, and to cause the recording unit to execute sparing recording.

A recording method according to the present disclosure includes: executing recording of information by laser irradiation on a recording position specified according to a recording request on a recording medium having a plurality of layers serving as recording layers where recording of information is performed by laser irradiation, and a track serving as a continuous recording area is formed, and recording of data is performed within a track, and also a plurality of tracks are set to one layer according to recording purpose; and determining, in the event that sparing processing occurs, a sparing destination by sparing destination selecting processing where as a first priority the next recording address of a track being recorded is selected as a sparing destination, and as a second priority the next recording address of a track overlapped with a track where recording is performed according to the recording request in a layering direction of the layers is selected as a sparing destination, and sparing recording is executed. A sparing destination selecting method according to the present disclosure selects a sparing destination by the first priority and second priority.

In the event that sparing processing has occurred as rewriting by defect sparing or POW (Pseudo Over Write), a predetermined sparing area (spare area) has been determined to be a sparing destination with optical discs according to the related art. On the other hand, a sparing area has been selected within a track where user data is recorded or the like without particularly setting a sparing area. In either case, recording of management information or user data is performed in a position different from a position specified by a writing request, but reliability or operation efficiency may deteriorate due to this. With sparing processing according to the present disclosure, a sparing destination is determined according to the first priority or second priority. With the first priority, a sparing destination is selected with a track being recorded, and accordingly, concentration into a track of the same type of information is maintained. According to the second priority, a sparing destination is selected within a track overlapped in a layer layering direction, and accordingly, concentration of the same type of information in a layer face direction (radial direction in the event of an optical disc) is maintained. Also, in the event of taking a file system where tracks of the same purpose are overlapped in a layer layering direction as a premise, the same type of information is maintained within a track of the same type even at the time of sparing processing. Further, a result is also obtained according to these wherein distributed allocation of information of a type intended to be recorded is maintained in physically separated positions.

According to the present disclosure, sparing recording is performed in a suitable position according to the type of information by sparing processing to a sparing destination in accordance with the first priority or second priority. Thus, concentration and distribution of information is suitably maintained, and improvement in operation efficiency and improvement in reliability are realized.

BRIEF DESCRIPTION OF THE DRAWINGS

FIGS. 7A and 7B are explanatory diagrams of a file system (single layer) serving as a comparative example;

FIGS. 10A and 10B are explanatory diagrams of track setting and sparing recording according to an embodiment;

FIGS. 11A and 11B are explanatory diagrams of a scene of track division according to an embodiment;

FIGS. 12A and 12B are explanatory diagrams of a scene of track division according to an embodiment;

FIGS. 13A and 13B are explanatory diagrams of sparing recording after track division according to an embodiment;

FIG. 14 is a flowchart of format processing according to an embodiment;

FIG. 18 is a flowchart of the recording processing according to an embodiment;

FIG. 19 is a flowchart of closing track processing according to an embodiment;

DETAILED DESCRIPTION OF EMBODIMENT

Hereinafter, an embodiment will be described in the following sequence.
1. Recording Medium
2. Location Control Technique Using Reference Plane
3. Host Apparatus and Recorder/Reproducer
4. Track Management, Recording, Sparing Processing According to Embodiment
4-1. File System
4-2. Format (Initial Track Setting) and Sparing Recording
4-3. Recording/Closing Track/Track Setting and Sparing Recording of Next Layer
5. Modifications 1. Recording Medium First, description will be made regarding a recording medium which a recorder/reproducer according to an embodiment of the present disclosure takes as an object of recording operation. Note that a multilayer recording medium (multilayer optical disc) which will be described below is just an example of a recording medium to be used for en embodiment. A configuration and mode of a recording layer or the like may also variably be conceived.

Figure 1:
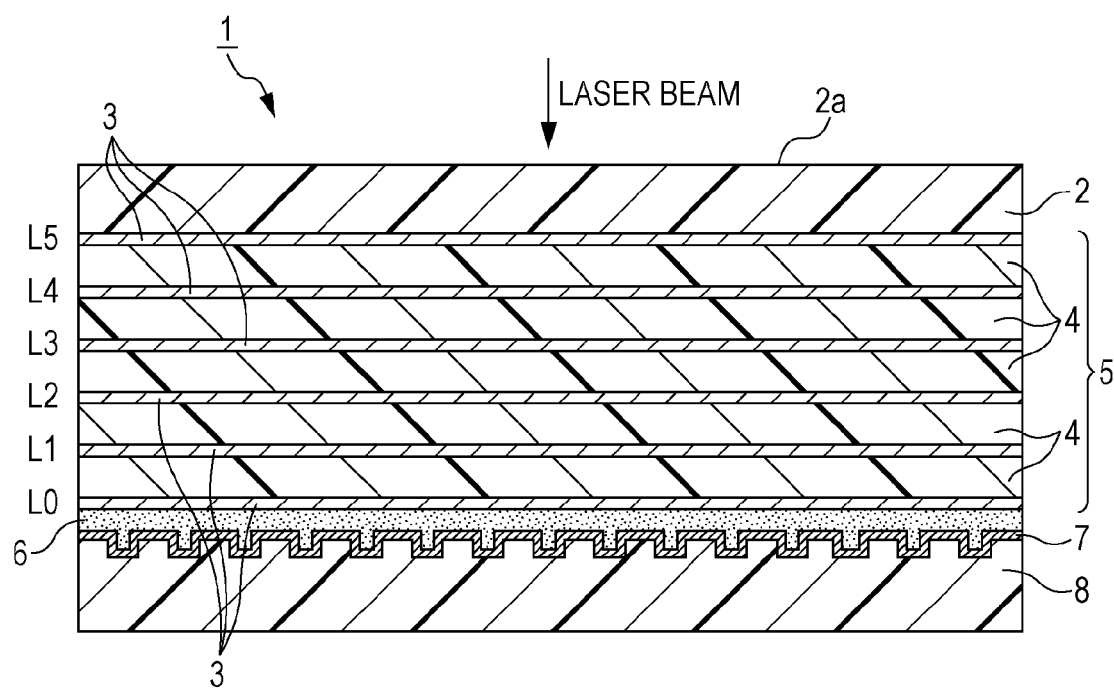
FIG. 1 is an explanatory diagram of a layer configuration of an optical disc to be used for an embodiment of the present disclosure.

FIG. 1 illustrates a cross-sectional configuration of a multilayer recording medium 1. This multilayer recording medium 1 is realized as an optical disc with the same diameter of 12 cm and the same thickness of 1.2 mm as with CD, DVD, and BD, for example. FIG. 1 schematically illustrates a cross-sectional configuration in the thick direction. As illustrated in FIG. 1, with the multilayer recording medium 1, there are formed a cover layer 2, a recording layer formation area 5 where multiple recording layers 3 are formed, an adhesion layer 6, a reflection film 7, and a substrate 8 in order from the upper layer side in FIG. 1. Here, a face where a laser beam from a later-described recorder/reproducer 10 side is input is the cover layer 2 side. A laser entry face 2a is the face of the cover layer 2. With the following description, the laser entry face 2a side will also be referred to as "front side", and the substrate 8 side will also be referred to as "rear side" with the laser entry direction as a reference.

With the multilayer recording medium 1, the cover layer 2 is configured of, for example, a resin, and serves as a protection layer of the recording layer formation area 5 formed on the rear side thereof.

The recording layer formation area 5 is configured so as to include multiple recording layers 3, and intermediate layers 4 inserted therebetween, as illustrated in FIG. 1. That is to say, the recording layer formation area 5 in this case is formed by layering repeatedly being performed such as recording layer 3→intermediate layer 4→recording layer 3→intermediate layer 4 . . . →recording layer 3. The recording layers 3 are configured of a semitransparent recording film. The intermediate layers 4 are configured of a resin material, for example, such as a heat-reversibility resin, ultraviolet curing resin, or the like.

In FIG. 1, though six recording layers 3 are formed within the recording layer formation area 5, this is consistently an example, and the number of recording layers may be set to other than "6". The recording layers 3 are referred to as layers L0, L1, L2, and so on in order from the rear side as viewed from the laser entry face 2a. This example has a 6-layer configuration, and accordingly, the layers L0 to L5 are formed as the recording layers 3.

With this example, with the recording layer formation area 5, no location guider (uneven pattern) in accordance with formation of a groove or pit row or the like is formed in each of the recording layers 3. That is to say, the recording layers 3 are formed in a planar shape. At the time of creation of such a recording layer formation area 5, a process for forming a location guider for each recording layer which is used for manufacturing of the current multilayer disc may be eliminated, and consequently, manufacturing cost and volume production of the multilayer recording medium 1 may effectively be reduced. The recording layers 3 have a planar shape, which means that address information and so forth according to the uneven patterns are not formed beforehand. At the time of recording of information, that is, at the time of recording of user data or management information which is principal information, the address information is recorded in accordance with recording of the principal information thereof. That is to say, the address information is embedded in the principal data (principal data for the purpose of recording such as user data or management information), and is encoded, and the encoded recorded data thereof is recorded.

A recording mark row is formed in the recording layers 3 in accordance with a recording operation. Note that the recording mark row mentioned here is a so-called "track" to be formed on an optical disc in a spiral shape. With the field of optical discs, in general, "track" is used for meaning an area unit to be continuously recorded (e.g., music unit in CD), and also used for meaning of a mark row, a pit row, a group, which are formed with a circumferential configuration, or the like. "Track" where track setting or close processing is performed in embodiments of the present disclosure means increments of areas to continuously be recorded. In order to clarify description, the term "track" will not be used for a mark row or the like to be formed with a circumferential configuration, and in stead of this, "recording mark row" will be used.

Figure 2A:
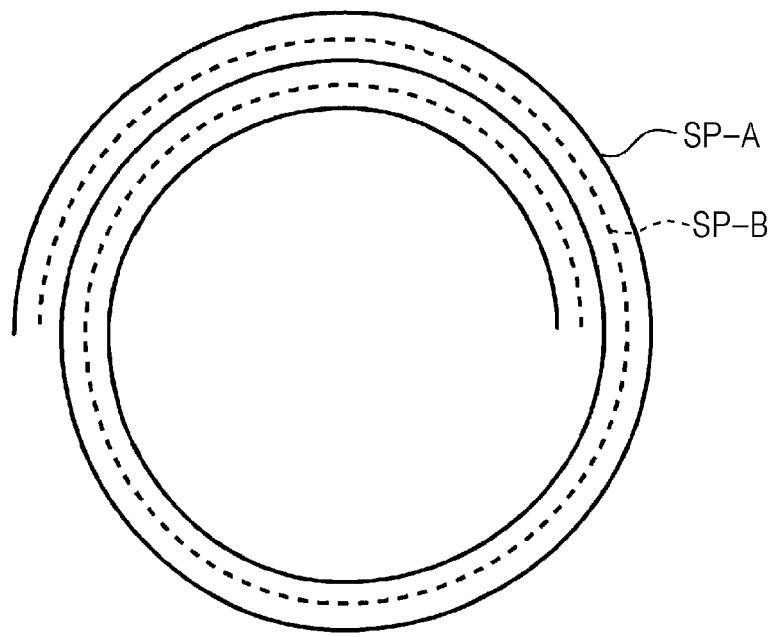
FIGS. 2A and 2B are explanatory diagrams of a track configuration of an optical disc to be used for an embodiment.
Figure 2B:
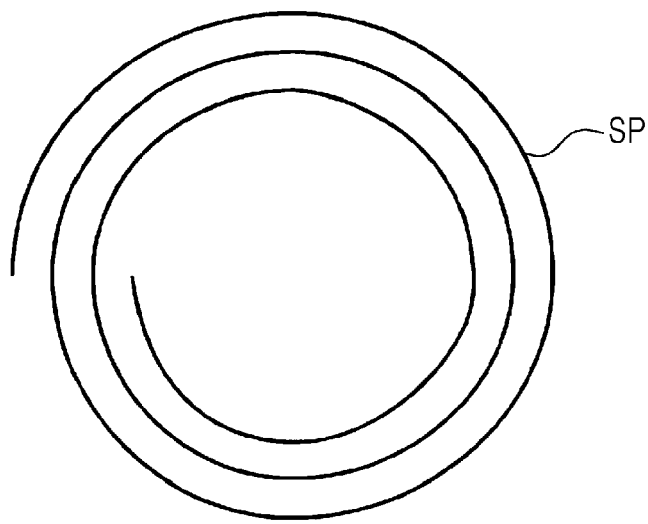

As examples of the recording mark row, an example formed in a double spiral shape as illustrated in FIG. 2A, and an example formed in a single spiral shape as illustrated in FIG. 2B may be conceived. The recording mark row in a single spiral shape is the same as with CD, DVD, or the like according to the related art. With the recording mark row in a double spiral shape, as illustrated with a solid line and a dashed line in FIG. 2A, tow spirals SP-A and SP-B are formed. The configuration of the recording mark row in a double spiral shape may be realized by a method for forming a spiral using two recording beams at the same time, or may be realized by a method for forming the first spiral SP-A with a certain pitch using one recording beam, and then forming the second spiral SP-B between the recording mark rows thereof. Note that an example of a double spiral is illustrated here, but there may be conceived a configuration of a recording mark row of which the spiral is further multiplexed such as a triple spiral, a fourfold spiral, or the like.

As illustrated in FIG. 1, a reflection film 7 is formed further to the rear side from the recording layer formation area 5 via an adhesion layer (intermediate layer) 6 configured of a predetermined adhesive material. With this reflection film 7, a location guider for guiding a recording/playing position is formed. Note that a location guider is formed in the reflection film, which means that the reflection film is formed on an interface where a location guider is formed.

Specifically, in this case, a location guider is formed on one face side of the substrate 8 in FIG. 1, and accordingly, an uneven cross-sectional shape is given as illustrated in FIG. 1, and the reflection film 7 is formed on the face where this uneven cross-sectional shape of the substrate 8 is given, whereby a location guider is formed on this reflection film 7. Note that the substrate 8 is configured of a resin such as polycarbonate or the like. This substrate 8 may be generated by injection molding using stamper for providing an uneven cross-sectional shape serving as the location guider, for example.

Here, as performed by the present recordable optical disc, address information that represents an absolute position in a direction parallel to the inner direction of the recording face of the multilayer recording medium 1 may be recorded by formation of the location guider. For example, in the event that the location guider is formed of a groove, this absolute position information may be recorded by modulation of the meandering (wobbling) cycle of this groove, and in the event that the location guider is formed of a pit row, the absolute position information may be recorded by modulation of pit length or formation interval.

Note that no location guider is formed for the recording layers 3 as described above, and control of a recording position on the recording layers 3 is performed based on reflected light from the reflection film 7 where the location guider is formed as will be described below. In this meaning, hereinafter, the reflection film 7 (reflection surface) where the location guider is formed will be referred to as "reference plane Ref". Also, address information recorded in the reference plane Ref in an uneven pattern will be referred to as "reference plane address" in meaning for being distinguished from an address to be recorded in a recording layer 3. Also, an address to be recorded in a recording layer 3 along with principal information will be referred to as "recording layer address".

No location guider is formed in the recording layers 3, and accordingly, there may be manufactured a multilayer recording medium which does not lead to increase in cost as described above. However, in this case, in order to suitably access a recording layer 3 where no address exists, the reference plane Ref is provided in a state layered on the recording layer 3. With the reference plane Ref, addresses are formed in an uneven pattern such as a wobbling groove or pit row or the like beforehand. Thus, access to a desired position on the multilayer recording medium 1 may be performed depending on an address of the reference plane Ref, and recording or reproducing of information (user data and management data) may be performed on a recording layer 3 in the position thereof.

Note that the description so far has been made regarding an example of the multilayer recording medium 1 with a recording layer 3 formed in a planar shape, and the following description will be made regarding an example using such a multilayer recording medium 1, but there may also be a configuration of the multilayer recording medium 1 wherein addresses are formed on a recording layer 3 of the multilayer recording medium 1 by uneven patterns such as wobbling grooves or pit rows or the like. Track management operation serving as a later-described embodiment of the present disclosure may also be applied to a multilayer recording medium in a mode wherein uneven patterns such as wobbling grooves and pit rows are formed on a recording layer 3.

2. Location Control Technique Using Reference Plane

Figure 3A:
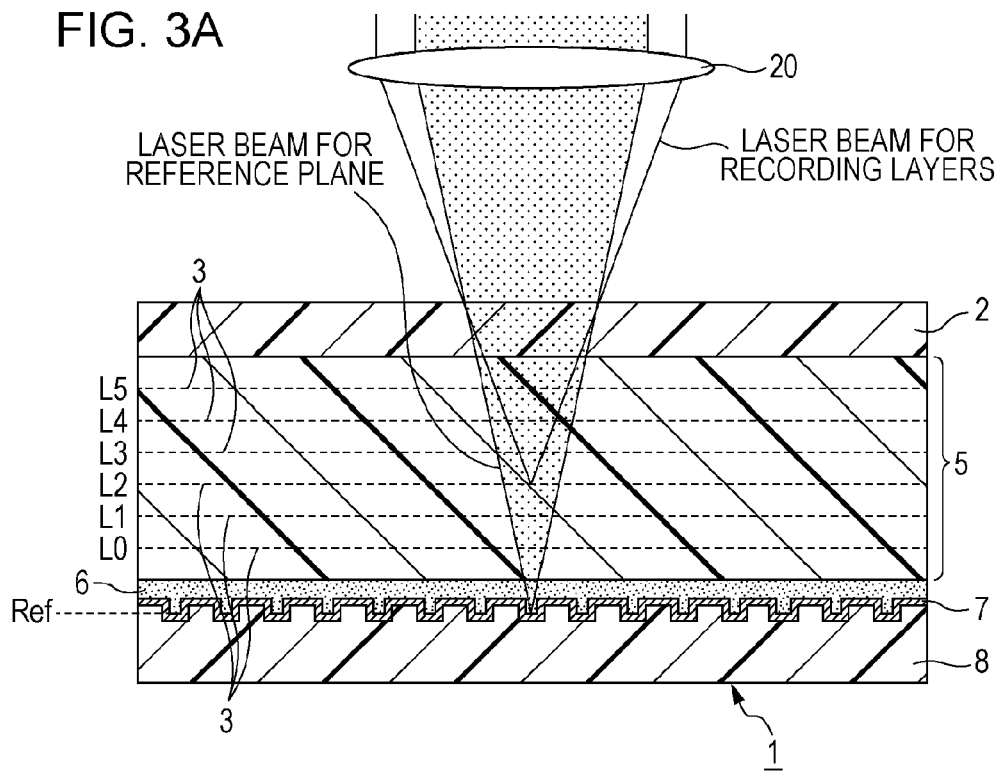
FIGS. 3A and 3B are explanatory diagrams of servo operation to an optical disc to be used for an embodiment.
Figure 3B:
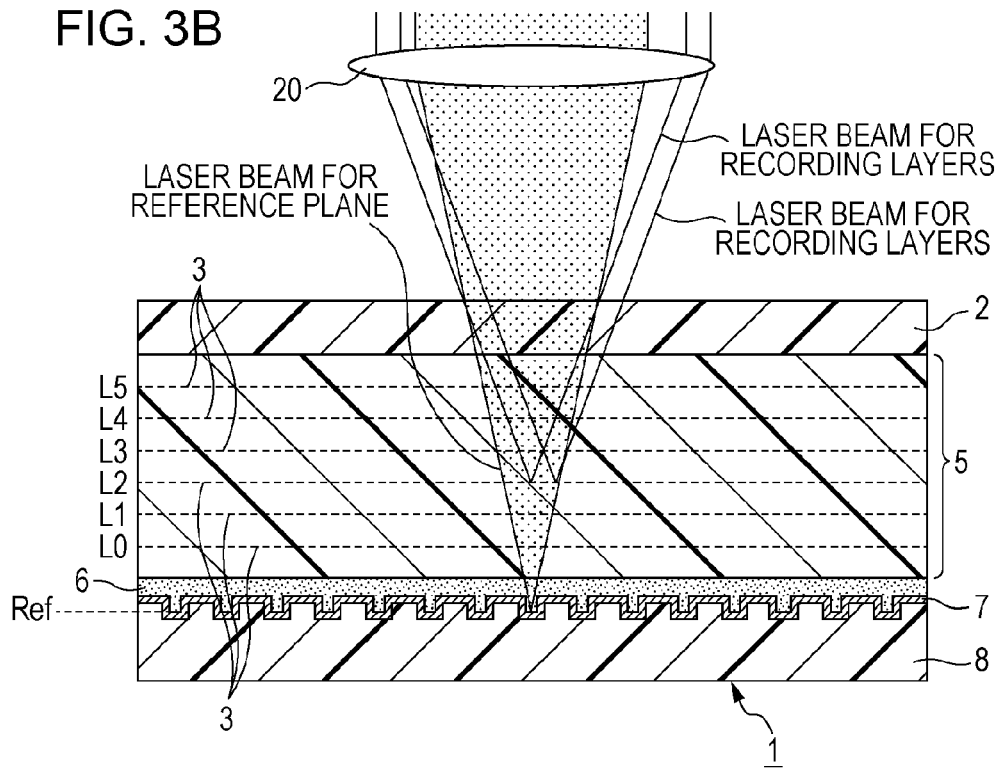

FIGS. 3A and 3B are explanatory diagrams regarding a location control technique with the location guider formed on the reference plane Ref being used. In order to realize location control regarding a laser beam for recording layers to be irradiated on a recording layer 3, a laser beam for performing location control based on the location guider on the reference plane Ref (hereinafter, referred to as laser beam for reference plane) is irradiated on the multilayer recording medium 1 according to the above-mentioned configuration, along with the laser beam for recording layers. Specifically, these laser beam for recording layers and laser beam for reference plane are irradiated on the multilayer recording medium 1 via a common objective lens 20 as illustrated in FIG. 3A. At this time, in order to realize accurate tracking servo, the optical axes of the laser beam for recording layers and laser beam for reference plane are configured so as to agree.

At the time of recording of a mark on a recording layer 3 (desired semitransparent recording film), the laser beam for reference plane is irradiated so as to be focused on the reflection surface (reference plane Ref) of the reflection film 7 as illustrated in FIG. 3A, and location control of the objective lens 20 is performed in accordance with a tracking error signal to be obtained based on the reflected beam thereof. That is to say, tracking servo is applied thereto. Thus, a location in a tracking direction of the laser beam for recording layers to be irradiated via the same objective lens 20 may be controlled to a desired location.

On the other hand, location control at the time of reproducing may be realized as follows. At the time of reproducing, a mark row (i.e., recorded track) is formed on a recording layer 3, and accordingly, tracking servo may be applied to this mark row with the laser beam for recording layers itself. That is to say, tracking servo at the time of reproducing may be realized by performing location control of the objective lens 20 in accordance with a tracking error signal to be obtained based on a reflected beam of the laser beam for recording layers.

Here, with the location control technique as described above, in the event that a beam having the same wavelength band as with the laser beam for recording layers is employed as the laser beam for reference plane, there is no other choice than that a reflection ratio regarding the laser beam for recording layers has to be increased regarding the reference plane Ref where the reflected beam of the laser beam for reference plane has to be obtained. That is to say, there is concern that stray light components increase accordingly, which markedly worsens reproducing performance. Therefore, let us assume that a beam of which the wavelength band differs from the laser beam for reference plane and laser beam for recording layers is used, and a reflection film having wavelength selectivity is used as the reflection film 7 where the reference plane Ref is formed. Specifically, in the case of the present example, the wavelength of the laser beam for recording layers is taken as the same approximate 405 nm as with a case of BD, and the wavelength of the laser beam for reference plane is taken as the same approximate 650 nm as with the case of DVD. As the reflection film 7, there is employed a wavelength selectivity reflection film which selectively reflects a beam having the same wavelength band as with the laser beam for reference plane, and transmits or absorbs a beam according to wavelength other than that. According to such a configuration, unnecessary reflected light components of the laser beam for recording layers may be prevented from being generated from the reference plane Ref, and a suitable S/N (signal-to-noise ratio) may be secured.

FIG. 3B is an example wherein two laser beams are irradiated as the laser beams for recording layers. Cases where two laser beams for recording layers are irradiated include a case where recording mark rows having a double spiral shape are recorded or reproduced at the same time, a case where regardless of a double spiral and a single spiral, adjacent track servo (ATS) is employed wherein recording of an adjacent recording mark row is performed along a recording mark row already recorded in a recording layer 3, and so forth.

Briefly speaking, with the ATS, one of the two laser beams for recording layers is taken as a spot for recording, and the other is taken as a spot for servo. Next, while the spot for servo is irradiated on a recording mark row already recorded (e.g., at the time of one round ahead) to perform tracking servo, a recording mark row adjacent to the recording mark row irradiated by this spot for servo is recorded using the spot for recording. In the event of the ATS, tracking servo with the reference plane Ref may not necessarily be performed during recording. However, tracking and address reading with the reference plane Ref is necessary for seek to a recording start location. Also, though detailed description will be avoided, in reality, during execution of the ATS, servo control frequently is inaccurate due to accumulation of error components. Therefore, correction of servo operation may also be performed with information of the reference plane Ref during execution of the ATS. Accordingly, the reference plane Ref is also employed for tracking control even at the time of recording in the event of employing the ATS method.

3. Host Apparatus and Recorder/Reproducer

Figure 4:
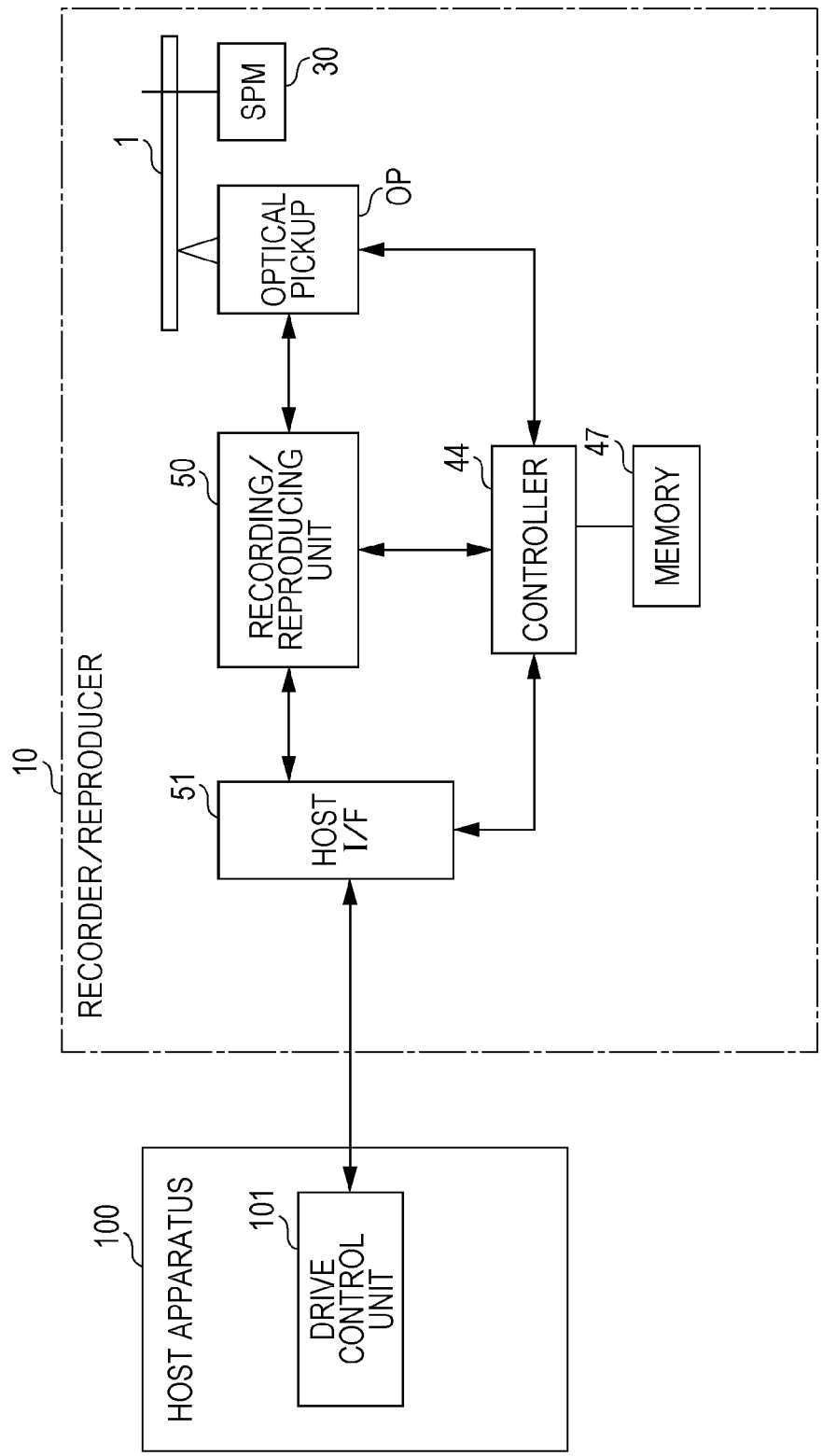
FIG. 4 is a schematic block diagram of a host apparatus and a recorder/reproducer, according to an embodiment.

Next, description will be made regarding the configurations of the host apparatus 100 and recorder/reproducer 10 which make up a recording system according to an embodiment, with reference to FIGS. 4 through 6. The recorder/reproducer 10 has a reproducing function along with a recording function for an optical disc serving as the multilayer recording medium 1. FIG. 4 illustrates a schematic configuration of the host apparatus 100 and recorder/reproducer 10.

The host apparatus 100 issue various commands to the recorder/reproducer 10, and causes the recorder/reproducer 10 to execute recording/reproducing to the multilayer recording medium 1 by the recorder/reproducer 10. The host apparatus 100 and recorder/reproducer 10 have a relation, for example, such as a host computer device and a disk drive device, and may be separate devices, or may be an integral device. For example, the host apparatus 100 serving as a computer device causes the recorder/reproducer 10 to execute recording or reproducing according to a request from application software or OS (Operating System). Here, a portion which controls the recorder/reproducer 10 is illustrated as a drive control unit 101. The drive control unit 101 performs, for example, file system management conforming to a UDF (Universal Disk Format) as a file system to be constructed in the multilayer recording medium 1, executes track setting and closing track processing for this purpose, and instructs the recorder/reproducer 10 to reflect a management state on the multilayer recording medium 1.

This FIG. 4 illustrates, regarding the recorder/reproducer 10, a controller 44, an optical pickup OP, a spindle motor 30, a recording/reproducing processing unit 50, a host interface 51, and memory 47. The host interface 51 of the recorder/reproducer 10 performs communication with the host apparatus 100. For example, the host interface 51 receives various commands and recorded data from the host apparatus, and also transmits data reproduced from the multilayer recording medium 1 to the host apparatus 100. The controller 44 controls the units so that recording, reproducing, format processing, or the like is executed for the multilayer recording medium 1 according to various commands to be supplied from the host apparatus 100 via the host interface 51.

Laser irradiation by the optical pickup OP is performed on the multilayer recording medium 1 while the multilayer recording medium 1 is rotated by the spindle motor 30, and recording or reproducing of information is performed. The recording/reproducing unit 50 performs signal processing or servo operation for recording or reproducing. The memory 47 is used for storing a work area and various parameters that the controller 44 uses. Hereinafter, description will be made in detail regarding a configuration example of the optical pickup OP and recorder/reproducer 10 with reference to FIGS. 5 and 6.

Figure 5:
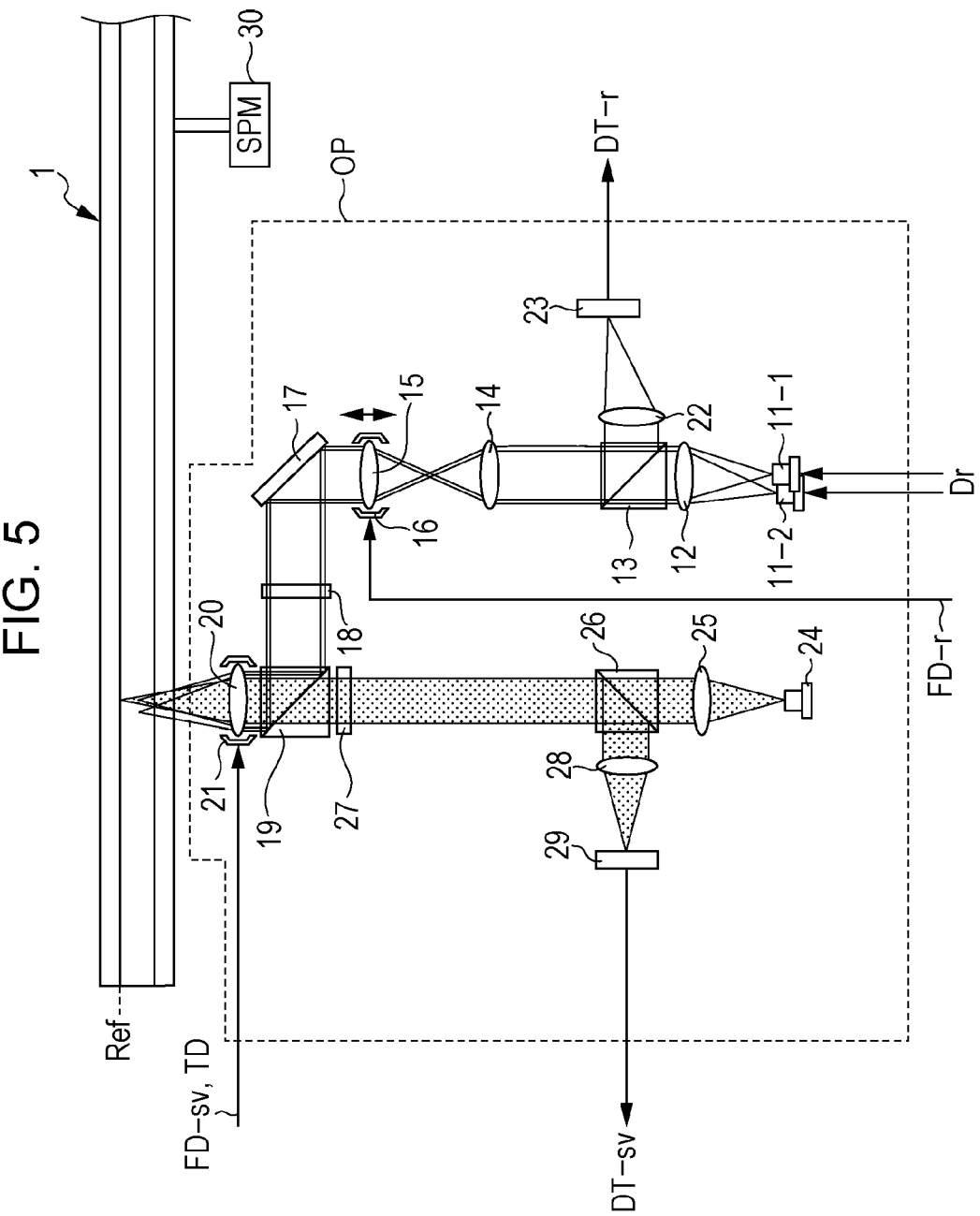
FIG. 5 is an explanatory diagram of a configuration of an optical system of a recorder/reproducer according to an embodiment.

FIG. 5 illustrates an internal configuration of the optical pickup OP included in the recorder/reproducer 10. Note that, as illustrated in FIG. 3B, a configuration example will be described here wherein two laser beams are output as the laser beams for recording layers, and also, the laser beam for reference plane is output. In the case of the method described in FIG. 3A, it has to be understood that the two systems of the laser beams for recording layers which will be described below are one system.

First, the multilayer recording medium 1 loaded in the recorder/reproducer 10 is set so that a center hole thereof is clamped in a predetermined location at this recorder/reproducer 10, and is in a state in which rotational driving by the spindle motor 30 illustrated in FIG. 4 is enabled. With the recorder/reproducer 10, the optical pickup OP is provided as a configuration for irradiating a laser beam for recording/reproducing on the multilayer recording medium 1 to be rotated and driven by the spindle motor 30.

Within the optical pickup OP, lasers 11-1 and 11-2 for recording layers which are light sources of the laser beams for recording layers. Also, there is provided a laser 24 for reference plane which is a light source of the laser beam for reference plane that is light for performing location control with the location guider formed on the reference plane Ref and reading of a reference plane address.

Also, with the optical pickup OP, there is provided an objective lens 20 serving as an output end to the multilayer recording medium 1 of the laser beams for recording layers and laser beam for reference plane. Further, there are provided a light-receiving unit 23 for recording layers for receiving a reflected beam from the multilayer recording medium 1 of the laser beams for recording layers, and a light-receiving unit 29 for reference plane for receiving a reflected beam from the multilayer recording medium 1 of the laser beam for reference plane.

With the optical pickup OP, there is formed an optical system for guiding the laser beam for recording layers to the objective lens 20 and also guiding a reflected beam from the multilayer recording medium 1 input to this objective lens 20 to the light-receiving unit 23 for recording layers. Note that, with the laser beams for recording layers of the two systems, for example, at the time of recording, one is used as a laser beam for recording, and the other is used as a laser beam for the ATS servo. Also, at the time of reproducing, an arrangement may be made wherein both laser beams are taken as laser beams for reproducing, and reproducing is performed on the spirals of a recording mark row having a double spiral shape at the same time. However, the use of the two laser beams for recording layers is not restricted to such use. For example, an arrangement may be made wherein the two laser beams for recording layers are both used for recording at the time of recording, and recording mark rows having a double spiral shape are formed at the same time. Further, description will be made with a configuration example wherein the recorder/reproducer 10 includes the one optical pickup OP, but it may also be assumed that the recorder/reproducer 10 includes multiple optical pickups OP. In this case, roles (utilizing method) of the laser beams for recording layers of the one or two systems in the optical pickups OP may variously be conceived.

The optical system for the laser beams for recording layers will specifically be described in accordance with the example in FIG. 5. The laser beams for recording layers of the two systems emitted from the laser 11-1 and 11-2 for recording layers are converted so as to become parallel beams via a collimate lens 12, and then input to a polarization beam splitter 13. The polarization beam splitter 13 is configured so as to transmit the laser beams for recording layers thus input from the light sources.

The laser beam for recording layers transmitted from the polarization beam splitter 13 is input to a focus mechanism configured so as to include a fixed lens 14, a moving lens 15, and a lens driving unit 16. This focus mechanism is provided for adjusting of a focusing position regarding the laser beam for recording layers, and is configured so that a side closer to the lasers 11-1 and 11-2 for recording layers is taken as the fixed lens 14, and the moving lens 15 is disposed on a far side, and the moving lens 15 side is driven in a direction parallel to the laser optical axis by the lens driving unit 16.

The laser beam for recording layers passes through the fixed lens 14 and moving lens 15 which make up the focus mechanism is reflected at the mirror 17, and then is input to a dichroic prism 19 via a quarter-wave plate 18. The dichroic prism 19 is configured so that a selective reflection surface thereof reflects a beam having the same wavelength band as with the laser beam for recording layers, and transmits a beam having a wavelength other than that. Accordingly, the laser beam for recording layers thus input is reflected at the dichroic prism 19.

The laser beam for recording layers reflected at the dichroic prism 19 is irradiated (focused) on the multilayer recording medium 1 (target recording layer 3) via the objective lens 20 as illustrated in FIG. 5. There is provided to the objective lens 20 a biaxial actuator 21 which holds this objective lens 20 in a focus direction (direction attaching or detaching for the multilayer recording medium 1), and in a tracking direction (direction orthogonal to the focus direction, i.e., disc radial direction) so as to be displaced. A focus coil and a tracking coil are provided to the biaxial actuator 21, and driving signals (later-described drive signals FD-sv and TD) are given thereto respectively, and accordingly, the objective lens 20 is displaced in each of the focus direction and tracking direction.

Here, in response to the laser beam for recording layers being irradiated on the multilayer recording medium 1 as described above, a reflected beam of the laser beam for recording layers is obtained from this multilayer recording medium 1 (recording layer 3 to be reproduced). This reflected beam of the laser beam for recording layers is guided to the dichroic prism 19 via the objective lens 20, and reflected at this dichroic prism 19. The reflected beam of the laser beam for recording layers reflected at the dichroic prism 19 is input to the polarization beam splitter 13 via the quarter-wave plate 18→mirror 17→focus mechanism (moving lens 15→fixed lens 14).

The reflected beam of the laser beam for recording layers thus input to the polarization beam splitter 13 passes through the quarter-wave plate 18 twice at an outward trip and a return trip, and consequently, the polarization direction thereof is rotated 90 degrees as compared to the outward trip beam thereof. As a result thereof, the reflected beam of the laser beam for recording layers thus input is reflected at the polarization beam splitter 13.

The reflected beam of the laser beam for recording layers reflected at the polarization beam splitter 13 is condensed on a light-receiving face of the light-receiving unit 23 for recording layers via a condensing lens 22. A received light signal obtained by the light-receiving unit 23 for recording layers receiving the reflected beam of the laser beam for recording layers will hereinafter be referred to as a received light signal DT-r.

Also, within the optical pickup OP, there is formed an optical system for guiding the laser beam for reference plane emitted from the laser 24 for reference plane to the objective lens 20 and also guiding the reflected beam of the laser beam for reference plane from the multilayer recording medium 1 input to this objective lens 20 to the light receiving unit 29 for reference plane. As illustrated in FIG. 5, the laser beam for reference plane emitted from the laser 24 for reference plane is converted so as to become a parallel beam via the collimate lens 25, and then input to the polarization beam splitter 26. The polarization beam splitter 26 is configured so as to transmit the laser beam (outward trip beam) for reference plane thus input from the laser 24 for reference plane side.

The laser beam for reference plane transmitted the polarization beam splitter 26 is input to the dichroic prism 19 via a quarter-wave plate 27. As described above, the dichroic prism 19 is configured so as to reflect a beam having the same wavelength band as with the laser beam for recording layers and so as to transmit a beam having a wavelength other than that, and accordingly, the laser beam for reference plane transmits the dichroic prism 19 and is irradiated on the multilayer recording medium 1 (reference plane Ref) via the objective lens 20.

Also, the reflected beam of the laser beam for reference plane (reflected beam from the reference plane Ref) to be obtained in response to the laser beam for reference plane thus irradiated on the multilayer recording medium 1 transmits the dichroic prism 19 via the objective lens 20, and is input to the polarization beam splitter 26 via the quarter-wave plate 27. The reflected beam of the laser beam for reference plane thus input from the multilayer recording medium 1 side passes through the quarter-wave plate 27 twice at an outward trip and a return trip, and consequently, the polarization direction thereof is rotated 90 degrees as compared to the outward trip beam thereof, and accordingly, the reflected beam of the laser beam for reference plane is reflected at the polarization beam splitter 26.

The reflected beam of the laser beam for reference plane reflected at the polarization beam splitter 26 is condensed on a light-receiving face of the light-receiving unit 29 for reference plane via a condensing lens 28. A received light signal obtained by the light-receiving unit 29 for reference plane receiving the reflected beam of the laser beam for reference plane will hereinafter be referred to as a received light signal DT-sv.

Here, as illustrated in the previous FIG. 1, with the multilayer recording medium 1, the reference plane Ref is provided further to the rear side from the recording layer formation area 5, and accordingly, at the time of recording, focus servo control of the objective lens 20 is performed so that the laser beam for reference plane is focused on the reference plane Ref thus provided to the rear side of the recording layer formation area 5. Moreover, with regard to the laser beam for recording layers, the collimation state of the laser beam for recording layers input to the objective lens 20 is adjusted by the previous focus mechanism (lens driving unit 16) being driven by focus servo control based on the reflected beam of the laser beam for recording layers so that the laser beam for recording layers is focused on a recording layer 3 formed further to the front side from the reference plane Ref.

Also, tracking servo control of the laser beam for recording layers at the time of reproducing is performed so as to have a spot of this laser beam for recording layers follow a mark row formed on the recording layer 3 to be reproduced. That is to say, tracking servo control of the laser beam for recording layers at the time of reproducing may be realized by controlling the location of the objective lens 20 based on the reflected beam of this laser beam for recording layers. Note that focus servo control at the time of reproducing may be the same as at the time of recording.

Figure 6:
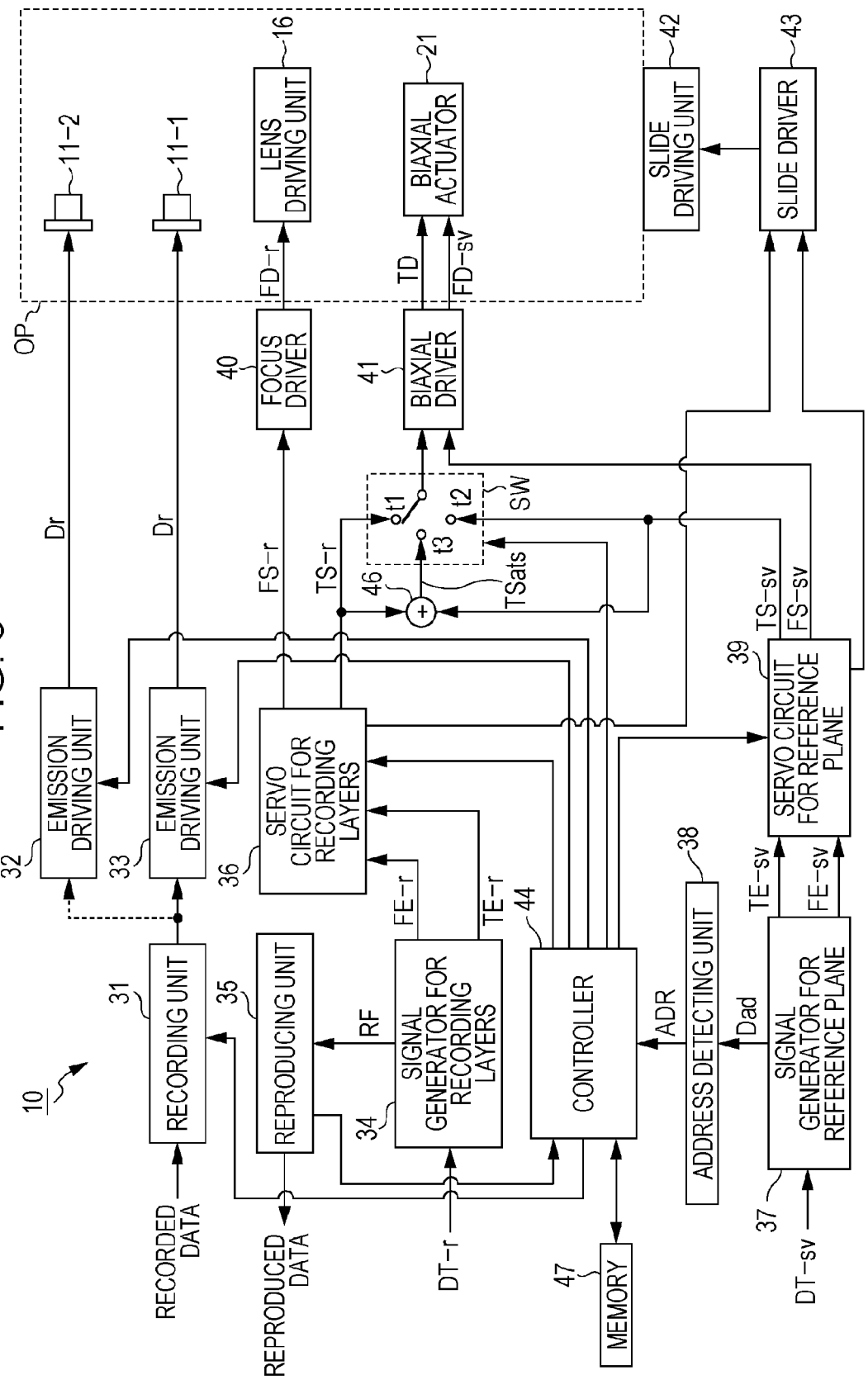
FIG. 6 is a block diagram of principal portions of a recorder/reproducer according to an embodiment.

FIG. 6 illustrates the detailed internal configuration of the recorder/reproducer 10 according to an embodiment. Note that, in FIG. 5, with regard to the internal configuration of the optical pickup OP, of the configuration illustrated in FIG. 4, only the lasers 11-1 and 11-2 for recording layers, lens driving unit 16, and biaxial actuator 21 are extracted and illustrated. Also, in this drawing, drawing of the spindle motor 30 and host interface 51 illustrated in FIGS. 4 and 5 is omitted. In FIG. 6, the units except for the controller 44, memory 47, optical pickup OP, and slide driving unit 42 may be conceived as the internal configuration of the recording/reproducing unit 50 in FIG. 4.

In FIG. 6, with the exterior of the optical pickup OP in the recorder/reproducer 10, there are provided a recording unit 31, an emission driving unit 32, an emission driving unit 33, a signal generator 34 for recording layers, a reproducing unit 35, a recording layer servo circuit 36, a focus driver 40, and a biaxial driver 41 as a configuration for performing recording/reproducing with a recording layer 3 in the multilayer recording medium 1 as a target, or location control of focus/tracking based on the reflected beam from the recording layer 3.

The recording unit 31 generates recording modulation code according to recorded data to be input. Specifically, the recording unit 31 obtains a recorded modulation code row which is, for example, a binary data row of "0" and "1" to be actually recorded with a recording layer 3 as a target by adding an error correction code to the recorded data to be input, or subjecting the recorded data to be input to predetermined recorded modulation coding, or the like. At this time, the recording unit 31 also performs addition processing of address information (recording layer address) for the recorded data according to an instruction from a later-described controller 44. The recording unit 31 gives a recorded signal based on the generated recorded modulation code row to one or both of emission driving units 33 and 32.

For example, in the event of executing the ATS (adjacent track servo) for forming a single-spiral-shaped or double-spiral-shaped track, at the time of recording, recording is performed regarding one of the laser beams for recording layers of the two systems, and tracking to an adjacent track is performed regarding the other using reproducing power. Therefore, the recorded signal generated by the recording unit 31 is given to only the one emission driving unit 33, the emission driving unit 33 generates a laser driving signal Dr based on the recorded signal to be input from the recording unit 31 at the time of recording, and emission-drives the laser 11-1 for recording layers based on the driving signal Dr. Thus, a mark row according to the recorded data may be recorded in a recording layer 3. At this time, the other emission driving unit 32 emission-drives the laser 11-2 for recording layers using reproducing power.

Also, while performing tracking control using the reference plane Ref, double spiral recording may also be performed regarding both of the laser beams for recording layers of the two systems at the same time. In such a case, the recorded signal generated by the recording unit 31 is given to the emission driving units 32 and 33 in a distributed manner. The emission driving units 32 and 33 generate a laser driving signal Dr based on the recorded signal, and the lasers 11-1 and 11-2 for recording layers are emission-driven based on the laser driving signal Dr. Thus, a mark row according to the recorded data may be recorded in a recording layer 3.

The signal generator 34 for recording layers generates an RF signal (reproduced signal), a focus error signal FE-r, and a tracking error signal TE-r based on the received light signal DT-r (output current) from the multiple light-receiving elements serving as the light-receiving units 23 for recording layers illustrated in FIG. 4. The focus error signal FE-r becomes a signal which represents focus error of the laser beams for recording layers as to the recording layer 3 serving as a recording/reproducing target. Also, the tracking error signal TE-r becomes a signal which represents location error in a radial direction of a spot position of the laser beam for recording layers as to a track formed in the recording layer 3. The RF signal obtained at the signal generator 34 for recording layers is supplied to the reproducing unit 35, and also, the focus error signal FE-r and tracking error signal TE-r are supplied to the servo circuit 36 for recording layers, respectively.

The reproducing unit 35 obtains reproduced data which is the previous recorded data restored by subjecting the RF signal to binarization processing, and predetermined demodulation processing such as decoding of recorded modulation code or error correction processing or the like. Also, the reproducing unit 35 also performs reproducing processing of a recording layer address inserted into recorded data. The recording layer address reproduced at the reproducing unit 35 is supplied to the controller 44.

The servo circuit 36 for recording layers performs servo calculation processing on the focus error signal FE-r, tracking error signal TE-r to generate a focus servo signal FS-r and a tracking servo signal TS-r. The tracking servo signal TS-r is supplied to a later-described switch SW.

Also, the focus servo signal FS-r is supplied to the focus driver 40. The focus driver 40 generates a focus drive signal FD-r based on the focus servo signal FS-r, and drives the lens driving unit 16 based on this focus drive signal FD-r. Thus, focus servo control regarding the laser beams for recording layers, that is, focus servo control for having the laser beam for recording layers focus on a recording layer 3 serving as a recording target is realized.

Also, the servo circuit 36 for recording layers also performs control regarding slide moving of the optical pickup OP by the slide driving unit 42. The slide driving unit 42 holds the entire optical pickup OP so as to be slide-driven in a tracking direction. The servo circuit 36 for recording layers extracts low-frequency components of the tracking error signal TE-r to generate a slide error signal, and generates a slide servo signal based on the slide error signal. This slide servo signal is given to the slide driver 43 to drive the slide driving unit 42, thereby realizing slide servo control of the optical pickup OP. Also, the servo circuit 36 for recording layers gives a control signal according to an instruction from the controller 44 to the slide driver 43, thereby realizing predetermined slide moving of the optical pickup OP by the slide driving unit 42. Also, the servo circuit 36 for recording layers also performs execution control of track jump operation for turning off the tracking servo, and jumping the spot of the laser beam for recording layers to another track, in response to the instruction from the controller 44.

A signal generator 37 for reference plane, an address detecting unit 38, and a servo circuit 39 for reference plane are provided to the recorder/reproducer 10 as a signal processing system regarding the reflected beam of the laser beam for reference plane.

The signal generator 37 for reference plane generates a necessary signal based on the received light signal DT-sv from the multiple light-receiving elements in the light-receiving unit 29 for reference plane illustrated in FIG. 5. Specifically, the signal generator 37 for reference plane generates a tracking error signal TE-sv which represents location error in the radial direction of the spot location of the laser beam for reference plane as to the location guider (pit row) formed in the reference plane Ref based on the received light signal DT-sv. Also, the signal generator 37 for reference plane generates a focus error signal FE-sv which represents focus error of the laser beam for reference plane as to the reference plane Ref (reflection film 7). Also, the signal generator 37 for reference plane generates an address detection signal Dad as a signal for detecting address information recorded in the reference plane Ref. In the event that a pit row is formed in the reference plane Ref, a summation signal has to be generated as this address detection signal Dad.

The address detection signal Dad generated by the signal generator 37 for reference plane is supplied to the address detecting unit 38. The address detecting unit 38 detects a reference plane address ADR recorded in the reference plane Ref based on the address detection signal Dad. The detected reference plane address ADR is supplied to the controller 44.

Also, the focus error signal FE-sv and tracking error signal TE-sv generated by the signal generator 37 for reference plane are supplied to the servo circuit 39 for reference plane.

The servo circuit 39 for reference plane performs servo calculation processing on the focus error signal FE-sv and tracking error signal TE-sv to generate a focus servo signal FS-sv and a tracking servo signal TS-sv.

The focus servo signal FS-sv is supplied to the biaxial driver 41. The biaxial driver 41 generates a focus drive signal FD-sv based on the focus servo signal FS-sv, and drives a focus coil of the biaxial actuator 21 based on this focus drive signal FD-sv. Thus, focus servo control regarding the laser beam for reference plane, that is, focus servo control for having the laser beam for reference plane focus on the reference plane Ref is realized.

Also, the servo circuit 39 for reference plane also performs control regarding slide moving of the optical pickup OP by the slide driving unit 42. Specifically, the servo circuit 39 for reference plane extracts low-frequency components of the tracking error signal TE-sv to generate a slide error signal, and generates a slide servo signal based on this slide error signal. This slide servo signal is given to the slide driver 43 to drive the slide driving unit 42, thereby realizing slide servo control of the optical pickup OP. Also, the servo circuit 39 for reference plane gives the slide driver 43 a control signal according to an instruction from the controller 44, thereby realizing desired slide moving of the optical pickup OP by the slide driving unit 42.

Also, the servo circuit 39 for reference plane also performs execution control of track jump operation for turning off the tracking servo, and jumping the spot of the laser beam for reference plane to another track, in response to the instruction from the controller 44.

The tracking servo signal TS-sv generated by the servo circuit 39 for reference plane is supplied to a t2 terminal of the switch SW.

Note that the tracking servo signals TS-r and TS-sv are supplied to a calculator 46, and a tracking servo signal TS-ats for the ATS servo is generated by predetermined calculation processing. The tracking servo signal TS-ats is supplied to a t3 terminal of the switch SW.

Here, the switch SW is provided for switching, regarding the tracking servo control of the object lens 20, tracking servo control for having the laser beam for reference plane follow the location guider on the reference plane Ref, tracking servo control for having the laser beam for recording layers follow a track on the recording layer 3, and the ATS control at the time of recording. For example, at the time of reproducing, there may be performed tracking servo control for having the laser beam for recording layers follow a track on the recording layer 3. At the time of recording, the ATS control is performed wherein recording is performed while tracking to an adjacent track. At the time of access (seek) for reproducing or recording, there is performed tracking servo control for having the laser beam for reference plane follow the location guider on the reference plane Ref.

The switch SW selectively outputs one of the tracking servo signals TS-r, TS-sv, and TS-ats in response to an instruction from the controller 44. The tracking servo signal TS selectively output by the switch SW is supplied to the biaxial driver 41, and the biaxial driver 41 drives the tracking coil of the biaxial actuator 21 using the tracking drive signal TD generated by the supplied tracking servo signal TS. Thus, the objective lens 20 is driven so as to have the spot of the laser beam for reference plane follow a track on the reference plane Ref, or driven so as to have the spot of the laser beam for recording layers follow a track on a recording layer 3.

The controller 44 is configured of a microcomputer including, for example, a CPU (Central Processing Unit), and memory (storage apparatus) such as ROM (Read Only Memory), RAM (Random Access Memory), and so forth, and performs the entire control of the recorder/reproducer 10 by executing control or processing in accordance with a program stored in the ROM or the like for example. For example, the controller 44 performs instructions for the servo circuit 36 for recording layers and servo circuit 39 for reference plane based on the recording layer address obtained at the reproducing unit 35, and the reference plane address ADR obtained at the address detecting unit 38 to perform seek operation control for moving the spot locations of the laser beam for reference plane and laser beam for recording layers to a predetermined address. Also, the controller 44 performs instructions for the servo circuit 36 for recording layers, servo circuit 39 for reference plane, and switch SW, thereby executing focus servo control or tracking servo control with a technique according to each case such as recording, reproducing, or seek using the reference plane Ref as to the multilayer recording medium 1.

The controller 44 performs, in response to a recording command or reproducing command from the host apparatus 100, the reproducing operation, recording operation, access (seek) operation, and servo execution control for these. Also, the controller 44 also performs recording operation for physical or logical format according to a format command from the host apparatus 100 as will be described later, or recording operation control serving as closing track processing according to recording progress. Also, the controller 44 performs, other than instructions from the host apparatus, for example, such as readout or updating of the management information in the multilayer recording medium 1, reproducing operation, recording operation, access (seek) operation, and servo execution control for these as appropriate.

The memory 47 is illustrated as a work area and a RAM area where the controller 44 stores various types of information. For example, the memory 47 is used for storing communication data with the host apparatus, storing laser power serving as an OPC result regarding each layer, and storing management information read out from the multilayer recording medium 1, management information to be updated according to recording operation, and so forth.

4. Track Management, Recording, Sparing Processing According to Embodiment 4-1. File System Description will be made regarding operation according to an embodiment, and particularly, a track management method, recording, and sparing processing. Note that the track management according to an embodiment is performed as file system management that the drive control unit 101 of the host apparatus 100 performs. Also, the controller 44 of the recorder/reproducer 10 performs recording control in response to a write command from the drive control unit 101, but at this time, sparing processing may occur. The controller 44 performs selection of a sparing destination in a priority order as later-described first priority, second priority, and third priority.

Also, with the present embodiment, the drive control unit 101 is configured to perform track setting processing for setting multiple tracks by a recording purpose to one layer of the multilayer recording medium 1, and closing track processing for enabling a continuous recording completion state within one layer regarding each track. Note that "track" mentioned here is a continuous recording area (SRR: Sequential Recording Range). Also, "close" mentioned here is a state in which recording of a track thereof has been completed, and is a management state in which this track will not be used for sequential recording serving as a continuous recording area. The controller 44 of the recorder/reproducer 10 performs recording operation with a track on the file system management by such a driving control unit 101 as a target.

Now, first, as a comparative example as to the embodiment, FIGS. 7A and 7B illustrate a logical layout and a physical layout of a file system (conforming to UDF (Universal Disk Format)) to be used for one-layer disc (single layer disc).

FIG. 7A illustrates, as a logical layout of the file system, an example wherein five tracks TK#1 to TK#5 have been set in volume space. Note that a spare area is set outside the volume space. A track TK illustrated in FIG. 7A is an increment wherein information is consecutively recorded in a physical area on an optical disc, and is equivalent to the above-mentioned SRR. With this example, the track TK#1 becomes address space where there is recorded management information such as a volume structure (Volume Structure), a metadata file FE (Metadata File File Entry), a metadata mirror file FE (Metadata Mirror File File Entry), and so forth. The track TK#2 is a continuous recording area of a metadata file, and becomes address space where a file set descriptor, and a file entry serving as the root directory are recorded. The track TK#3 becomes address space where user data is consecutively recorded, for example. The track TK#4 is a continuous recording area of a metadata mirror file (copy of metadata), and becomes address space where a file set descriptor (FSD: File Set Descriptor) and a file entry (File Entry) are recorded. The track TK#5 becomes address space where an AVDP (Anchor Volume Descriptor Pointer) is recorded. Note that details regarding the above-mentioned each data (volume structure, metadata file FE, metadata mirror file FE, file set descriptor, AVDP, etc.) have been described in "Universal Disk Format Specification Revision 2.50" OSTA, 2003, or the like.

As illustrated in FIG. 7B, these tracks TK#1 to TK#5 are physically disposed in a layer L0 of the 1-layer disc. With regard to the tracks TK#1 to TK#5, according to data recording of each, an NWA (Next Writable Address: Next recording address) is updated to the next address of a recorded address, and at the time of recording, recording is performed from an address indicated with the NWA. Thus, with the tracks TK#1 to TK#5, recording advances by physical areas within a track being sequentially used. In FIG. 7B, a shaded portion indicates an area where recording has been performed (note that a recorded area is similarly illustrated as a shaded portion in later-described FIGS. 8B, 9B, 10 to 13, and 21).

Figure 8A:
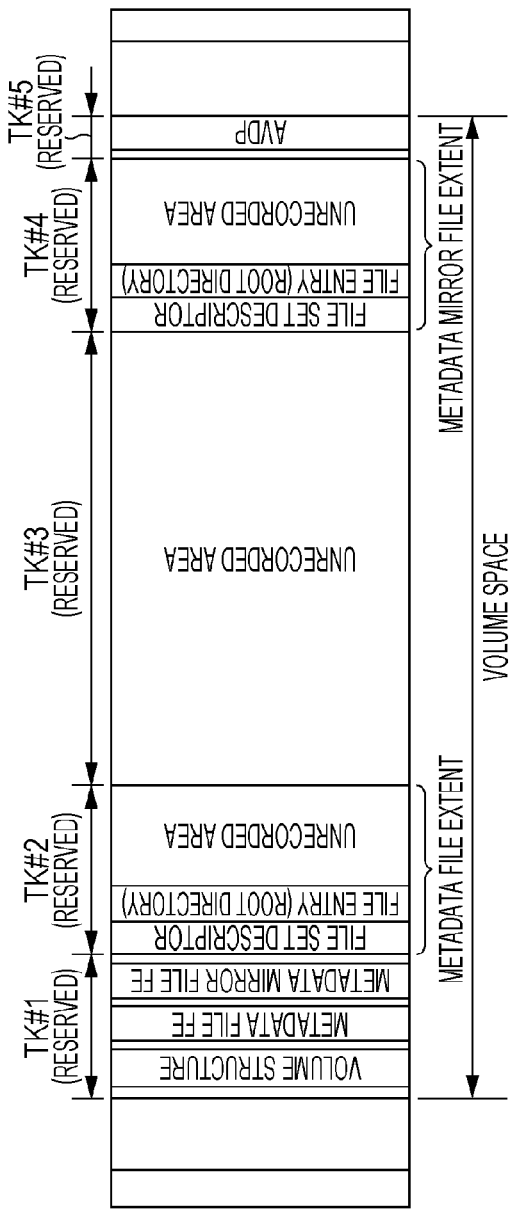
FIGS. 8A and 8B are explanatory diagrams of a file system (multilayer) serving as a comparative example.
Figure 8B:
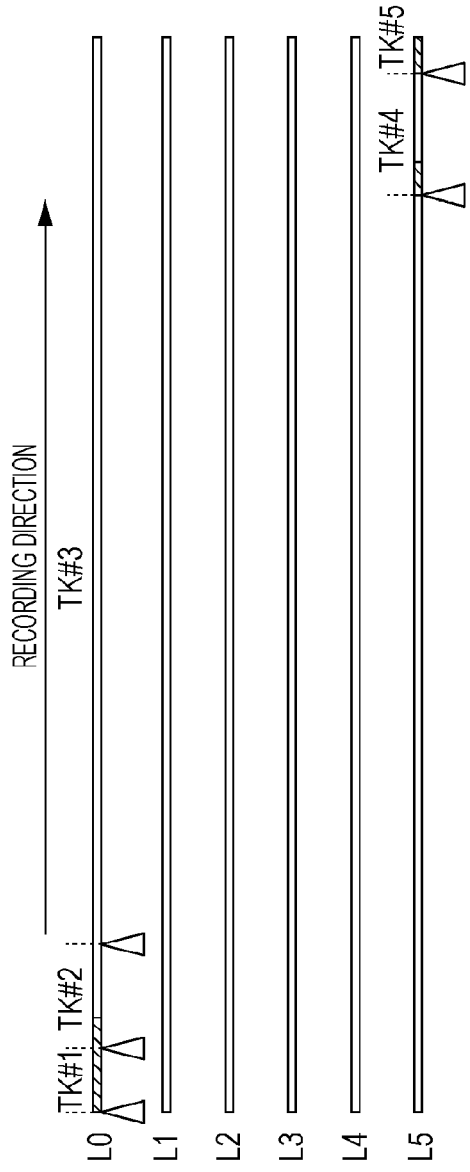

In the event of a 1-layer disc, there is the layer L0 alone as a physical recording area, and consequently, as illustrated in FIG. 7B, the tracks TK are formed in the layer L0. Now, FIG. 8 illustrates an example of a multilayer disc serving as a comparative example. The logical layout in FIG. 8A is the same as with the schematic diagram 7A. FIG. 8B illustrates a physical layout example in the event of a 6-layer disc. Track recording of the logical layout in FIG. 8A is realized using areas of layers L0 to L5. The layers L0 to L5 are taken as one physical recording space, and the tracks TK#1 to TK#5 are set. With this example, the tracks TK#1 and TK#2 are set within the layer L0, and the track TK#3 is set over a range of the layers L0 to L5. The tracks TK#4 and TK#5 are set in the rear edge area of the layer L5. That is to say, this example in FIGS. 8A and 8B is an example where the file system conforming to the 1-layer disc has been applied to a multilayer disc by simply expanding the entire of each recording layer without change.

However, in the event of applying the file system as illustrated in FIGS. 8A and 8B to the multilayer recording medium 1 such as a multilayer disc or the like, this includes the following problem. For example, with regard to writing of metadata and writing of metadata mirror, operation efficiency deteriorates. This is because a layer has to greatly be moved. Also, a layer on the rear side is influenced by a recording situation of a layer on the front side as viewed from the laser entry face side, and tends to execute unsuitable recording. For example, let us say that recording of user data at the track TK#3 has advanced, and has reached the layer L1. With regard to the tracks TK#1 and TK#2, the recorded layer L1 exists on the laser entry face side, which may disturb recording to the tracks TK#1 and TK#2 in the future, for example, updating of the management information in accordance with recording of user data, or the like. Further, at the time of recording of an AVDP, a layer has to be greatly moved. For example, according to recording to the track TK#2 at the layer L0, in the event that updating of an AVDP or the like of the track TK#5 has to be performed, the layers L0 and L5 have to be moved, and performance deteriorates. Also, when considering that sparing processing occurs, there may be cases where aggregation of the management information, dispersion of metadata and metadata mirror for example, and so forth, is not maintained.

That is to say, a file system according to the related art and a physical track management method have many disadvantageous points for the multilayer recording medium 1. Therefore, with the present embodiment, first, track management and sparing processing will be performed as follows, which will be described with reference to FIGS. 9A to 13B.

Figure 9A:
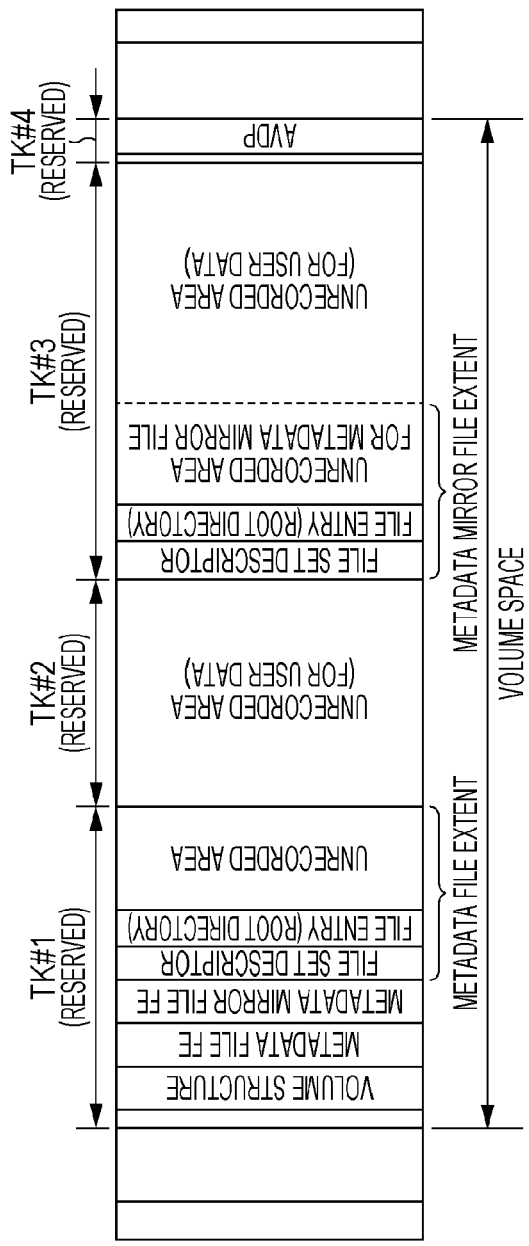
FIGS. 9A and 9B are explanatory diagrams of a file system according to an embodiment.

FIG. 9A is a logical layout example of a file system according to an embodiment. With an initial state, four tracks TK#1 to TK#4 are set in the volume space as an example. With this example, the track TK#1 becomes address space where a volume structure, a metadata file FE, a metadata mirror file FE, a file set descriptor, and a file entry serving as the root directory are recorded. That is to say, the track TK#1 is taken as a management information track where a management information file is taken as a recording purpose. The track TK#2 becomes address space where user data is consecutively recorded, for example. That is to say, the track TK#2 becomes a user data track of which purpose is to record user data. The track TK#3 is a continuous recording area of a metadata mirror file (copy of metadata), and becomes address space where a file set descriptor and a file entry are recorded. That is to say, the track TK#3 becomes a mirror track where a mirror file of management information is taken as a recording purpose. The track TK#4 becomes address space where an AVDP (Anchor Volume Descriptor Pointer) is recorded.

Figure 9B:
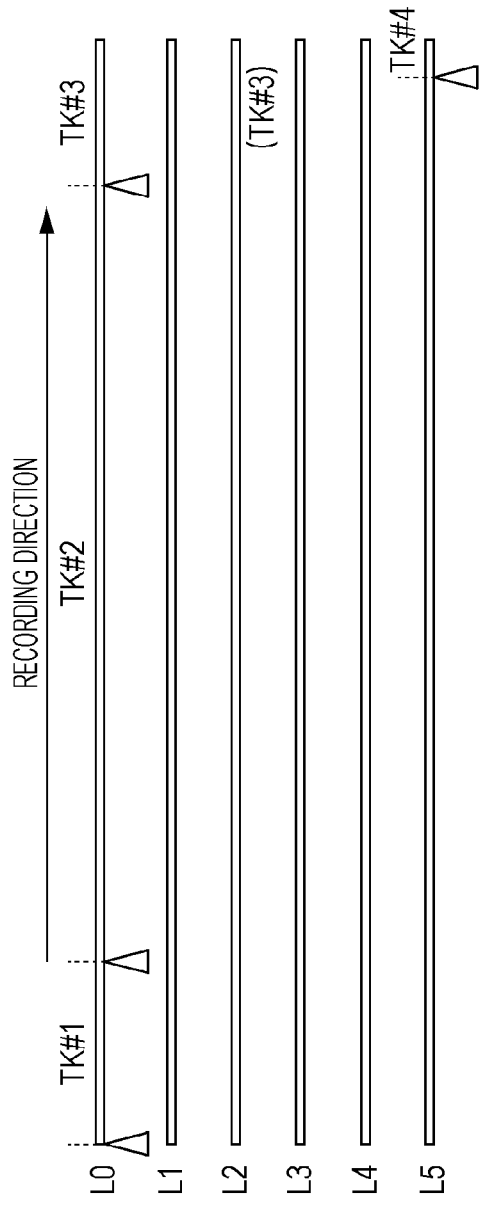

Such tracks TK#1 to TK#4 are set on the multilayer recording medium 1 as with FIG. 9B in an initial state using format processing. That is to say, with the layer L0 which is the rear-most side as viewed from the laser entry face side, the tracks TK#1, TK#2, and TK#3 are set. The track TK#4 is set to the rear edge portion of the layer L5 which is the front-most side as viewed from the laser entry face side. Now, let us say that, with the layers L0 to L5, recording has advanced with a parallel track path. With this drawing, for example, with all of the layers L0 to L5, recording has advanced from the left towards the right (e.g., from the outer circumference to the inner circumference of a disc). With regard to recording, layers are used from the rear-most layer L0 in order.

Now, the track TK#4 is set to the rear edge portion (terminal portion of the volume space) of the front-most layer L5 as illustrated in FIG. 9A, and accordingly, the recording position of the AVDP conforms to the UDF regulation. With the file configuration of the UDF (see "Universal Disk Format Specification Revision 2.50" OSTA, 2003), a volume recognition area to be used for consecutive recording is started with an interval of 16 sectors from the top LSN (Logical Sector Number: logical address). An anchor point is disposed in the position of the 256th sector, and the position of the last sector N or the N-256th sector. A track where the AVDP of the last sector N or the N-256th sector is recorded becomes the track TK#4 mentioned here.

However, this track TK#4 is closed without actually performing recording of the AVDP or the like immediately after setting. FIG. 10A illustrates a state in which the track TK#4 has been closed. With the tracks TK#1, TK#2, and TK#3 which have been set, the NWA is valid. The NWAs (NWA1, NWA2, and NWA3) of the tracks TK#1, TK#2, and TK#3 indicate the start address of each track. On the other hand, the track TK#4 has been closed, and there is no NWA (NO NWA). Thus, hereinafter, the track TK#4 is in a management state in which actual data writing to the track TK#4 will not be performed.

However, writing of various types of management information of the AVDP, and the others has to be performed at the time of such a format. The drive control unit 101 instructs the recorder/reproducer 10 to perform recording of the management information. The drive control unit 101 instructs the recorder/reproducer 10 to record the above-mentioned volume structure (including AVDP, MVDS (Main Volume Descriptor Sequence), a metadata file FE, and so forth in the track TK#1. Thus, as illustrated in FIG. 10B, recording of the management information is performed on the track TK#1. Note that, according to this recording, the NWA1 which indicates the next writing address also advances. Also, the drive control unit 101 instructs the recorder/reproducer 10 to record a mirror file of management information in the track TK#3. Thus, recording of management information mirror is performed on the track TK#3. According to this recording, the NWA3 also advances.

Further, the drive control unit 101 instructs the recorder/reproducer 10 to perform recording of the AVDP and so forth regarding the track TK#4. However, the track TK#4 has been closed. Data rewriting of a closed track may be handled by POW (Pseudo Over Write) using sparing processing. In the event that a sparing area has been prepared on the multilayer recording medium 1, logical rewriting (POW) has to be performed using the sparing area thereof, and even if a sparing area has not particularly been prepared, POW may be performed using another track area as a sparing area, for example. In the case of the present example, depending on a writing request (write command) to the track TK#4, POW processing is performed at the recorder/reproducer 10, and the ADVP and so forth are recorded in another track. For example, recording is performed on an address indicated with the NWA3 of the track TK#3. Therefore, as the above-mentioned writing operation by the optical pickup OP, all of the above-mentioned writings are performed with the layer L0 as a target.

With the present embodiment, the controller 44 of the recorder/reproducer 10 determines a sparing destination at the time of POW in the following priority order stipulated as a sparing destination selecting algorithm.

First priority: the NWA of a track being recorded
Second priority: of tracks having the same radial direction (tracks overlapped in a layer layering direction), the NWA of a track in an opened state first found after search from the rear-most side
Third priority: the NWA of a track in an opened state first found after search from the top of the volume space In the event of a writing request for the track TK#4, the first priority is not applied (since the track TK#4 ahs already been closed), and accordingly, the second priority is applied. Thus, as tracks having the same radial position as with the track TK#4 and overlapped in a layering direction, the track TK#3 corresponds thereto, and the AVDP and so forth are recorded for sparing in the NWA of the track TK#3.

As described above, the initial state becomes, as viewed regarding the layer L0, a state in which the tracks TK#1 (management information track), TK#2 (user data track), and TK#3 (mirror track) for each recording purpose are set. The track TK#4 is set to the layer L5, but actual writing of the AVDP and so forth is performed on the track TK#3. Note that the layers L2 to L5 are in an unused state other than the track TK#4, and not track setting has been performed. Therefore, up to an area immediately before the track TK#4 of the layers L1 to L5 is in a state transiently managed as the track TK#3.

Thereafter, according to progress of recording, track setting is performed in order on the layers at the front-most side. For example, let us say that recording of user data regarding the track TK#2 of the layer L0 has advanced, and the track TK#2 has been completely used. In this case, as illustrated in FIG. 11A, the track TK#2 is closed. Rewriting of data regarding a closed track may be handled by POW using the sparing processing as described above.

The track TK#2 is closed, and also as with the layer L0, the tracks TK#4 (management information track), TK#5 (user data track), and TK#6 (mirror track) for each recording purpose is set to the layer L1 next to the front side. In this state, recording of user data is sequentially executed using the track TK#5. Note that the track TK#4 serving as an AVDP recorded area on the terminal side in the volume space is in a state managed as the track TK#7 by this track setting.

With regard to the layer L0 at this point-in-time, the tracks TK#1, TK#2, and TK#3 are in a state completed only within the layer L0. Note that, with the state in FIG. 11A, the tracks TK#1 and TK#3 have not been closed. In this case, recording of a management information file or mirror file may be performed using the tracks TK#1 and TK#3. Closer to the laser entry face side than the tracks TK#1 and TK#3, the tracks TK#4 and TK#6 are set to the layer L1 so as to be overlapped, but this is because the tracks TK#4 and TK#6 have not been recorded yet, and the tracks TK#4 and TK#6 do not have an adverse affect on recording of the tracks TK#1 and TK#3. The tracks TK#1 and TK#3 are closed in the event of each of the areas has completely been used, or at the time of the NWA becomes invalid for any reason, or the like. Thus, all of the tracks TK#1, TK#2, and TK#3 are in a state managed as a track of which the consecutive recording has been completed within the layer L0 alone.

Also, in FIG. 11A, at the time of the track TK#2 being closed, the tracks TK#4 to TK#6 have newly been set in the layer L1 by dividing the track TK#3, but this has a meaning that the track TK#5 to be used for recording of user data is prepared. In the event that the track TK#1 has previously completely been used prior to the track TK#2, the track TK#1 is closed, and the tracks TK#4 to TK#6 are newly set to the layer L1. That is to say, the track TK#4 to be used for recording of the management information is prepared.

FIG. 11B illustrates a case where recording of user data regarding the track TK#5 of the layer L1 has advanced from the state in FIG. 11A, and the track TK#5 has completely been used. In this case, in the same way as described above, the track TK#5 is closed. Next, the tracks TK#7 (management information track), TK#8 (user data track), and TK#9 (mirror track) for each recording purpose is set to the layer L2 next toward the front side. In this state, recording of user data is sequentially executed using the track TK#8. Also, the track TK#7 serving as an AVDP recorded area on the terminal side in the volume space is in a state managed as the track TK#10 by this track setting.

FIG. 12A illustrates a case where the track TK#9 of the layer L2 has completely been used from the state in FIG. 11B. In this case, the track TK#9 is closed. Next, the tracks TK#10 (management information track), TK#11 (user data track), and TK#12 (mirror track) for each recording purpose is set to the layer L3 next toward the front side. In this state, recording of the mirror file thereafter is sequentially executed using the track TK#12. Also, the track TK#10 serving as an AVDP recorded area on the terminal side in the volume space is in a state managed as the track TK#13 by this track setting.

FIG. 12B illustrates a state in which tracks have been set up to the layer L5 in the same way. The tracks TK#16, TK#17, and TK#18 have been set to the layer L5. With the layer L5 alone, there is a track serving as an AVDP recording area on the terminal side in the volume space (track TK#19 in this point-in-time), and accordingly, the number of tracks becomes four. Let us say that, with the layers L0 to L5, three tracks for each recording purpose are set thereto respectively, and moreover, each track is completed within just one layer.

In this manner, track setting is performed regarding the layers according to progress of recording. Also, updating of the management information such as an AVDP as to a management information track or a track on the terminal side in the volume space, or the like also occurs according to progress of recording.

First, in the event of performing sparing recording due to influence of a defect or the like during recording to a certain track, or in the event of performing sparing recording for rewriting, as the first priority, the NWA of the track thereof is selected as a sparing destination.

On the other hand, in the event of other than recording of a track, the second priority is applied. FIGS. 13A and 13B illustrate an example wherein sparing recording is performed by the second priority being applied. FIG. 13A illustrates a state after the point-in-time in FIG. 11A, for example. Let us say that the track TK#2 is closed, but the tracks TK#1 and TK#3 are opened tracks, and the NWA1 and NWA3 are in a state illustrated in FIG. 13A. Let us say that at a certain point-in-time, a writing request (write command) for instructing recording of the management information to the track TK#1 has been issued from the host apparatus 100 (drive control unit 101) to the controller 44. The controller 44 will perform writing of data to the track TK#1 in response to this.

The drive control unit 101 instructs rewriting of the management information by specifying, for example, LSN0 (e.g., the head of the track TK#1). The controller 44 converts the LSN into a PSN (Physical Sector Number: physical address), and performs writing control. However, recording of data (e.g., recording of the management information written in the above-mentioned initial state) has already been performed on the area thereof, the NWA is in a state illustrating a location indicated as NWA1, and recording may not be performed. In this case, sparing processing due to POW occurs. This case is not recording of a track, and accordingly, the controller 44 determines a sparing destination in accordance with the second priority of the above-mentioned sparing destination selecting algorithm. Specifically, of tracks in the same radial direction as with a recording address, the sparing destination is set to the NWA of a track in an opened state first found after searching from the rear-most side. In the case of this example, the track TK#1 corresponds to this. Therefore, sparing recording is performed from the NWA1 as illustrated as a black-lacquered portion. The NWA advances to the location of an NWA1' by this sparing recording. It goes without saying that registration of sparing information is performed according to this sparing recording.

Thereafter, let us say that according to progress of recording such as user data and so forth, recording of the management information has advanced from the information track TK#1 to TK#4, recording of user data has been performed in track TK#5, and recording of a management information mirror file has advanced from the track TK#3 to TK#6. The tracks TK#1 and TK#3 are closed in the event of having completely been used. Recording regarding a subsequent management information track as illustrated in FIG. 13A is made up of NWA4 in the track TK#4, recording of subsequent user data is made up of NWA5 in the track TK#5, and recording of a mirror file is made up of NWA6 in the track TK#6.

For example, in this state, let us say that an AVDP write command for the track TK#7 which is an AVDP recording area on the terminal side in the volume space has occurred. The track TK#7 is closed, and accordingly, POW also occurs in this case. In the same way as with the case of the above-mentioned format, in the event of a writing request for the track TK#7, there is no relevance of the first priority, and accordingly, the second priority is applied thereto. Specifically, of tracks in the same radial direction (tracks overlapped in a layering direction of layers), the NWA of a track in an opened state first found after searching from the rear-most side is taken as a sparing destination. In this case, the track TK#3 is closed, and accordingly, NWA6 of the next track TK#6 is selected, and sparing recording of an AVDP and so forth is performed from the NWA6 of the track TK#6. In this manner, writing of an AVDP and so forth for a fixed management information track is performed in order from the rear side except for a closed track which is a track having the same radial location.

With the present embodiment, track management and sparing processing are performed as with the above-mentioned examples. First, a track serving as an AVDP recording area set in the first format (track TK#4 in FIGS. 10A and 10B) is closed immediately after setting, and actual recording of an AVDP and so forth is performed on the track TK#3 by POW. The track TK#4 is set as an AVDP recording area, whereby track management conforming to the UDF regulations is realized.

Moreover, an AVDP and so forth are recorded in the track TK#3 of the layer L0. This improves operation performance in the sense that the layer L0 to be used for first recording is employed. For example, in the event that updating of management information of an AVDP and so forth has to be performed according to recording of user data for the track TK#2, writing of the management information is performed on the track TK#1 and the track TK#3 which is a sparing destination of the track TK#4, and accordingly, access by the optical pickup OP is restricted to within the same layer, and operation efficiency improves. Also, even if recording has advanced, as with the tracks TK#3 and TK#6, the opportunities for updating recording of an AVDP and so forth to be actually performed on the same layer or an adjacent layer has increased. Thus, recording operation efficiency as a whole for the multilayer recording medium 1 improves.

Also, as a sparing destination of an AVDP recording track of the layer L5, a mirror track located in the same radial position is employed. This means that an AVDP may be recorded in a position far away from a management information track such as the track TK#1 or the like in a radial direction. Specifically, an AVDP and so forth may be recorded in areas separated at the inner and outer circumferences of a disc sandwiching a user data track, which are the management information track (TK#1 etc.) and mirror track (TK#3 etc.), so there is little influence of defects or the like, and reliability of information may be improved.

Also, in the case of the present example, track setting processing is performed wherein multiple tracks serving as continuous recording areas are set to one layer of the multilayer recording medium 1 according to recording purpose. For example, a management information track, a user data track, and a mirror track are set. Also, closing track processing is also performed wherein each track is set to a continuous recording completed state within one layer alone. Thus, a management information file and a mirror file may be recorded in positions separated as the track TK#1 and TK#3 for example in a distributed manner, which is strong for a defect, and improves reliability of the management information (metadata and so forth). Also, recording of a management information file and a mirror file may be performed within the same layer, and operation performance is also improved. Also, recording of a management information file, user data, and a mirror file may effectively be performed on each track in each layer, and also, recording is distributed into the tracks, and accordingly, expansion of metadata in the multilayer recording medium 1 may simply be performed with high reliability being maintained.

According to recording operation, in the event that recording for a certain track of a certain layer has advanced, and the area of this track within this layer has become an already recorded state, closing track processing for this track is performed. At this time, track setting processing is performed as to another layer wherein multiple tracks are set according to recording purpose. Thus, recording of user data, recording of a management information file, and recording of a mirror file may be executed using each layer. In other words, there is secured a state in which file recording with benefit of large capacity owing to multilayering being received may normally be executed. Though specific examples will be described in later-described FIGS. 16 to 19, for example, a user data track is completed in each layer, but the user data track in each layer may consecutively be used, and accordingly, capacity of each layer is not wasted. This may similarly be applied to a management information track and a mirror track.

Also, at the time of performing the track setting processing, of layers which have not been taken as a track setting processing target, the track setting processing is performed on a layer positioned at the rear-most side as viewed from the laser beam entry face side as a target. In particular, as for the multilayer recording medium 1 where no track has been set, first, as illustrated in FIG. 9B, the track setting processing is performed on the layer L0 positioned at the rear-most side as viewed from the laser beam entry face side, and also, recording operation is executed from a track of the layer L0 at the rear-most side. Also, thereafter, according to progress of recording, track setting is performed in order on the next layer on the front side. Layers are used from the rear side in order, and accordingly, each layer is prevented from being influenced by the recorded state of layers toward the front side, and consequently, suitable recording operation is ensured. In particular, as illustrated in FIGS. 11A and 12B, a management information track, a user data track, and a mirror track in each layer are each set so as to be overlapped in the incident light axial direction of a laser beam. That is to say, tracks having the same purpose are disposed so as to be overlapped in the laser beam axial direction. Thus, recording of a management information file, user data, and a mirror file may be executed by using an area without waste in order from layers on the rear side. That is to say, each of a management information file, user data, and a mirror file may sequentially be recorded without being influenced by layers closer to the front side.

For example, as described above, after the state in FIG. 11A, even when performing recording of user data on the track TK#5 in the layer L1, a management information file and a mirror file may be recorded in the tracks TK#1 and TK#3 in the layer L0 which have not been closed (have not completely been used). Also, the track TK#3 is also used as a sparing destination of recording of an AVDP and so forth of a management information track until the track TK#3 is closed. This is because the track TK#5 where recording of user data is performed is not overlapped with the tracks TK#1 and TK#3. Accordingly, a management information file and a mirror file are recorded first using remaining areas in the tracks TK#1 and TK#3 without immediately using the tracks TK#4 and TK#6, whereby the area on the multilayer recording medium 1 may be used without waste.

With the sparing destination selecting algorithm by the controller 44 of the recorder/reproducer 10, the above-mentioned first priority, second priority, and third priority are sequentially applied. First, according to sparing destination selection of the first priority, a possibility that the same type of information may be put together within a track is enhanced. That is to say, as described above, with the present example, track setting is performed according to a recording purpose such as a management information track, a user data track, and a mirror track. For example, defect sparing at a management information track, or rewriting of the management information by POW is spared within the management information track. Accordingly, the management information is put together within a management information track, and the efficiency of readout access at the time of necessity is promoted. There is also provided an advantage such as reduction in mount time, or the like. It goes without saying that the sparing recording operation itself has no great movement, and the efficiency of recording operation also becomes suitable. This may also be applied to a user data track and a mirror track. Further, even when sparing recording is performed, the management information is restricted to within a management information track, and a mirror file is restricted to within a mirror track, and accordingly, dispersion of the management information and a mirror file does not collapse due to the sparing processing. Thus, reliability of information may be maintained.

Also, in the event that the first priority may not be applied, a sparing destination is selected by the second priority. In this case, a sparing destination is selected within tracks overlapped in the layer layering direction, and accordingly, concentration of the same type of information in the layer face direction (radial direction in the event of an optical disc) is maintained. In particular, with the file system of the present file system, tracks having the same purpose are set so as to be overlapped in the layer layering direction. As described in FIGS. 11 and 12, a management information track, a user data track, and a mirror track in each layer are each overlapped in the layer layering direction. Accordingly, in the event that sparing processing is performed by the second priority being applied as well, the same type of information is maintained in a state recorded within the same type of track. For example, a sparing destination of recorded data of a certain mirror track becomes another mirror track. This also consequently means that dispersion of the management information and a mirror file does not collide due to the sparing processing, and reliability of information may be maintained even when the second priority is applied thereto.

Note that, when considering a normal disc use situation, sparing recording is performed by the first priority and second priority being applied in almost all the cases. In order to handle a case where these may not be applied, the third priority is prepared, thereby maximally avoiding a situation of sparing incapable.

4-2. Format (Initial Track Setting) and Sparing Recording

The drive control unit 101 according to the present embodiment outputs various instructions to the controller 44 for realizing the above-mentioned operation so as to realize actual file system management. Also, the controller 44 of the recorder/reproducer 10 performs recording operation control according to a write command or the like from the drive control unit 101. In the event that the sparing processing occurs in a process thereof, selection of a sparing destination is performed in accordance with the above-mentioned sparing destination selecting algorithm.

Hereinafter, specific processing examples will be described. First, now, description will be made regarding an example of format processing by the drive control unit 101 at the time of a request for file system format being issued at the host apparatus 100 for example. This processing is processing for realizing the above-mentioned operations in FIGS. 9 and 10. Note that description of specific processing serving as the following format processing, or later-described recording/closing track/track setting of the next layer will be made as processing of the drive control unit 101, but specifically, this processing may also be realized by performing this as processing of an application or OS at the host apparatus 100, or as processing of the controller 44 of the recorder/reproducer 10. Also, a WO (Write Once) type multilayer optical disc is assumed as the multilayer recording medium 1.

FIG. 14 illustrates processing of the drive control unit 101 at the time of a format command. In the event of having received a format request, in step F101 the drive control unit 101 obtains disc parameters of the multilayer recording medium 1, and in step F102 confirms whether or not this is a blank disc. In the event of other than a blank disc, the drive control unit 101 proceeds from step F102 to F103, where the format processing is ended assuming that the currently loaded multilayer recording medium 1 is an optical disc of which formatting is inhibited.

In the event of a blank disc, the drive control unit 101 proceeds to step F104 to perform physical format. Specifically, the drive control unit 101 instructs the controller 44 of the recorder/reproducer 10 to perform physical format of the multilayer recording medium 1. In the event that there is an error in this case, the drive control unit 101 proceeds from step F105 to F106, and takes this as a format error. Upon physical format being completed, in step F107 and thereafter, the drive control unit 101 actually performs the track setting processing. In step F107, the drive control unit 101 sets (reserves) the track TK#4 as a track to be used for recording of an AVDP or RVDS (Reserve Volume Descriptor Sequence). As illustrated in FIG. 9B, the track TK#4 is set in the rear edge portion of the layer L5 at the front-most side in a 6-layer disc, for example.

Next, in step F108, the drive control unit 101 performs close processing of the track TK#4. This is processing for setting, in accordance with the UDF regulations, an AVDP area as the track TK#4, and also closing this, and thereafter recording the AVDP in another location by POW. Note that the AVDP in the UDF is a point for the host first reading out, and is information whereby all of the files in the optical disc may be accessed from here. As described above, with the UDF, the AVDP is stipulated so as to be recorded in two or more locations of the sector of the logical block number (LBN) 256, the last selector (Z), and of Z-256 sectors.

Next, in step F109, the drive control unit 101 sets the track TK#1 to the layer L0 as a management information track. Further, in step F110, the drive control unit 101 sets the track TK#2 to the layer L0 as a user data track. In this state, as illustrated in FIGS. 9A and 9B, areas of the tracks TK#1, TK#2, and TK#4 are determined. A section between the track TK#2 and the track TK#4 becomes the track TK#3 which is transiently a mirror track.

In step F111, the drive control unit 101 creates a UDF structure. In step F112, the drive control unit 101 performs control for recording an AVDP, an MVDS (Main Volume Descriptor Sequence), a file set descriptor, a metadata file FE, and a metadata mirror file FE in the track TK#1. Specifically, the drive control unit 101 instructs the controller 44 to record these management information in the track TK#1 in the multilayer recording medium 1. In this case, as illustrated in FIG. 10A, the track TK#1 is in an opened state, and there is NWA1, and accordingly, recording of the management information of the above-mentioned AVDP, MVDS, and so forth is performed from the NWA1. FIG. 10B illustrates a state in which recording of these has been performed.

In step F113, the drive control unit 101 confirms an error of the above-mentioned recording operation, and in the event that there is no error, in step F114 performs processing for recording the AVDP and RVDS in the track TK#4. That is to say, the drive control unit 101 instructs the controller 44 to perform recording for the track TK#4. However, in this case, the track TK#4 has already been closed, and accordingly, the AVDP and RVDS are here recorded in another area by POW on the recorder/reproducer 10 (controller 44) side. That is to say, a sparing destination is selected by the sparing destination selecting algorithm of the first priority, second priority, and third priority. As described above, in this case, the second priority is applied, and as illustrated in FIG. 10B, sparing recording is performed on the track TK#3 by POW.

Next, in step F115, the drive control unit 101 confirms an error of the recording operation, and in the event that there is no error, in step F116, formatting has normally been completed. Note that, in the event that determination is made in step F113 or F115 that there is a write error, the processing is ended as formatting failure in step F117. Thus, the multilayer recording medium 1 is in the initial state in FIG. 10B.

Now, processing of the controller 44 of the recorder/reproducer 10 as to the write commands in the above-mentioned steps F112 and F114, that is, processing at the time of reception of a write command including the sparing destination selecting algorithm will be described with reference to FIG. 15.

Figure 15:
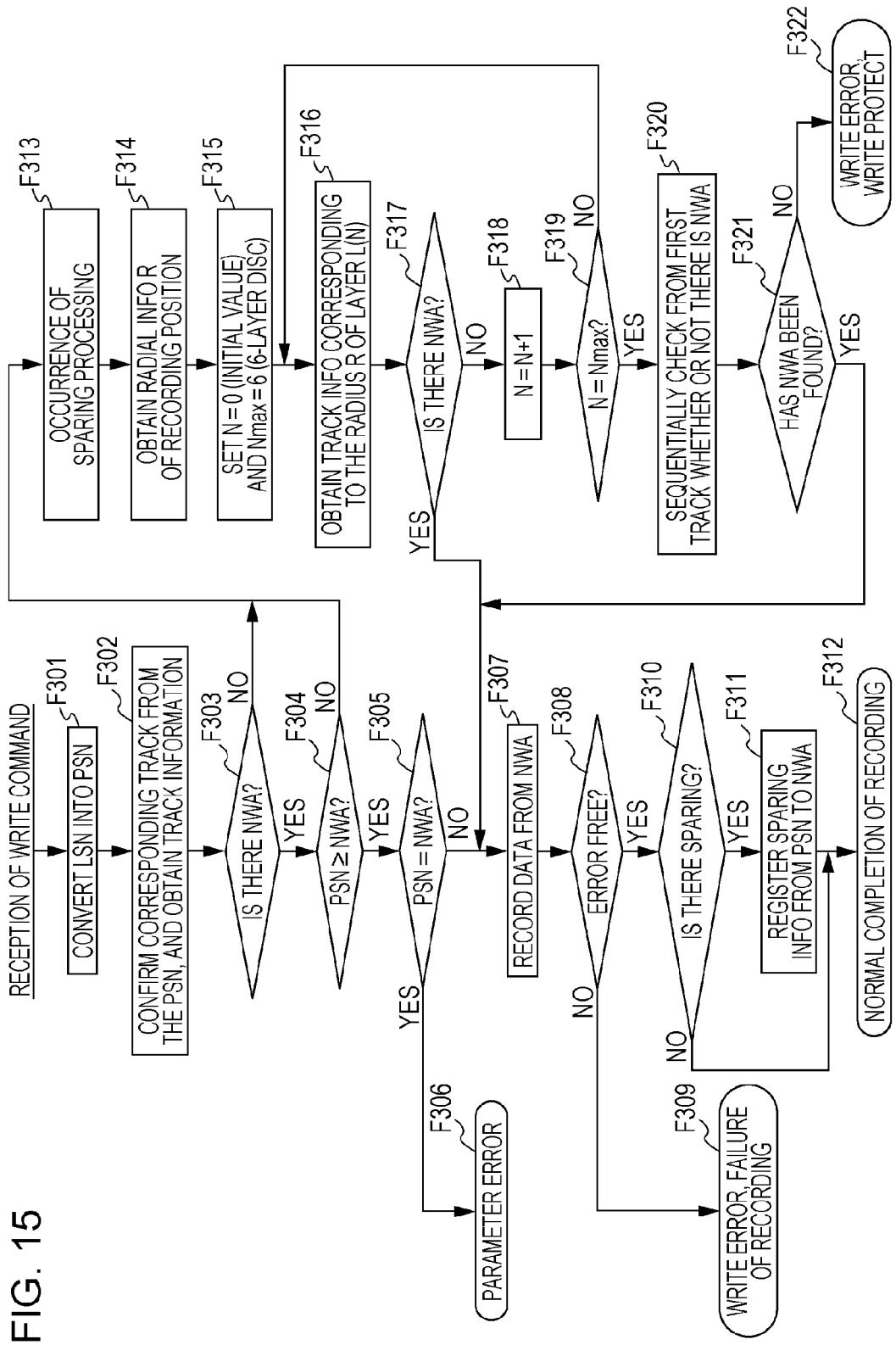
FIG. 15 is a flowchart of processing of a recorder/reproducer at the time of reception of a recording command according to an embodiment.

Upon receiving the write command from the drive control unit 101, the controller 44 perform processing in FIG. 15. First, in step F301, the controller 44 converts an LSN (Logical Sector Number: logical address) serving as a recording address specified by the write command into a PSN (Physical Sector Number: physical address). Next, in step F302, the controller 44 confirms the corresponding track from the PSN to obtain track information. For example, in the event of step F112 in FIG. 14, a management information track TK#1 becomes the corresponding track, and in the event of step F114, a fixe management information track TK#4 becomes the corresponding track, for example.

In step F303, the controller 44 confirms whether or not there is NWA regarding the corresponding track. In step F304, the controller 44 compares the NWA of the corresponding track and the PSN which is the physical address of a recording destination, and confirms whether or not PSN≥NWA. That is to say, the controller 44 confirms whether or not the PSN points the NWA and thereafter. In step F305, the controller 44 confirms whether or not NWA of the corresponding track=PSN. This confirms whether or not consecutive recording is maintained. Unless NWA=PSN, in step F306 the controller 44 returns a parameter error to the drive control unit 101, and the processing is ended.

In the event that determination is made in steps F303, F304, and F305 that there is NWA, PSN≥NWA, and NWA=PSN, in step F307 the controller 44 performs actual recording control. Specifically, the controller 44 controls the recording/reproducing unit 50 and optical pickup OP to record the data supplied from the host apparatus 100 in the multilayer recording medium 1 from the NWA. Thus, sequential recording is executed following positions already recorded so far at the track serving as a target of this-time write command.

In step F308, the controller 44 confirms an error, and in the event that there is an error, in step F309 the processing is ended with recording failure as a write error. Note that the error confirmed in step F308 is a case where though defect sparing or retry has been performed at the recorder/reproducer 10, a writing error has still remained. This also includes retry on the file system side (drive control unit 101) depending on cases.

In the event that there is no error, the controller 44 proceeds to step F310, where in the event that sparing processing has not been performed, in step F312 the processing is ended with normal recording. Note that sparing processing may be performed due to existence of a defect area or the like during recording of data based on the control in step F307. In this case, the controller 44 selects the NWA at that point-in-time as a sparing destination, and executes sparing recording. That is to say, the NWA of a track being recorded of the first priority is applied as the above-mentioned sparing destination selecting algorithm. In the event that such sparing processing has been performed, the controller 44 proceeds from step F310 to F311, where with regard to the spared PSN, sparing information for the NWA of the sparing destination is registered, in step F312 the processing is ended with normal recording.

For example, in the event of reception of the write command by step F112 in FIG. 14 described above, the above-mentioned processing is normally performed at the controller 44. Specifically, in step F112 in FIG. 14, the drive control unit 101 specifies an LSN equivalent to the head of the track TK#1. In this case, the NWA1 is the head of the track TK#1. Accordingly, the processing of the controller 44 proceeds to steps F303→F304→F305→F307, and recording of the management information from the NWA1 of the track TK#1 is performed.

On the other hand, in the event that determination is made in step F303 that there is no NWA, or in the event that determination is made in step F304 that PSN≥NWA is not satisfied, the controller 44 proceeds to step F313 to perform sparing processing. This case is not recording of a track, and accordingly, the second priority and third priority area confirmed as the sparing destination selecting algorithm. Note that a case where determination is made in step F303 that there is no NWA is, as illustrated in FIG. 13B, a case where a track to be recorded has been closed, or the like. Also, a case where determination is made in step F304 that PSN≥NWA is not satisfied is, as illustrated in FIG. 13A, a case where rewriting of data already recorded in a track has been requested.

In these cases, first, in step F314, the controller 44 obtains radial information R of a recording position. In step F315, the controller 44 sets N=0 as an initial value of a variable N regarding the layer number, and also sets Nmax=the number of layers+1. In the event of a 6-layer disc, Nmax=66 is set.

Next, in step F316, the controller 44 obtains information of a track corresponding to the radius R of the layer L(N). Also, in step F317, the controller 44 confirms whether or not there is NWA in this track. Unless there is NWA, in step F318 the controller 44 increments the variable N, and in step F319, in the event that N=Nmax is not satisfied, the controller 44 returns to step F316. That is to say, steps F316, F317, F318, and F319 are processing for sequentially checking the NWA from the layer L0 on the rear side regarding a track including the radial position R toward the layers on the front side. In the event that there is NWA in the corresponding track, the controller 44 proceeds from step F317 to F307 to perform recording of data from this NWA. That is to say, recording of data is performed on a sparing destination. Steps F308 and thereafter are the same as above. It goes without saying that the processing in step F311 is also performed in this case.

The above-mentioned processing is processing wherein, as the above-mentioned sparing destination selecting algorithm, "of tracks having the same radial direction (tracks overlapped in the layering direction of layers), the NWA of a track in an opened state first found after search from the rear-most side" of the second priority is taken as a sparing destination. In the case of step F114 in FIG. 14 described above, this processing is applied. Specifically, in the event that a write command of an AVDP and so forth regarding the track TK#4 has been issued in step F114 in FIG. 14 as illustrated in FIG. 10B, in step F303 the controller 44 determines that there is no NWA, and proceeds to step F313. The controller 44 confirms the NWA3 of the track TK#3 of the layer L0 as a track having the same radius information R as with the track TK#4. As illustrated in FIG. 10B, the NWA3 of the track TK#3 is valid, and accordingly, in step F307 sparing recording of an AVDP and so forth is performed from the NWA3 of this track TK#3.

Incidentally, in the event that NWA is not valid regarding tracks of all of the layers having the common radius information R, the controller 44 proceeds from step F319 to F320. The controller 44 sequentially checks from the first track TK#1 that there is NWA. In the event that NWA has been found, the controller 44 proceeds from step F321 to F307 to perform sparing recording of data from the NWA thereof. Step F308 and thereafter are the same as described above. It goes without saying that the processing in step F311 is also performed in this case. This is processing wherein as the above-mentioned sparing destination selecting algorithm, "the NWA of a track in an opened state first found after searching from the head of the volume space" of the third priority is taken as a sparing destination. Note that in the event of a result that there has been no NWA after search of all of the tracks, the controller 44 determines that sparing processing may not be performed, and in step F322 takes this as a write error.

4-3. Recording/Closing Track/Track Setting and Sparing Recording of Next Layer

As described in FIGS. 11A to 12B, hereinafter, close of a track or track setting for another layer is performed in accordance with progress of recording operation. Subsequent operation will be described as processing of the drive control unit 101 in the event that a recording command (file write request) has occurred at the host apparatus 100.

Figure 16:
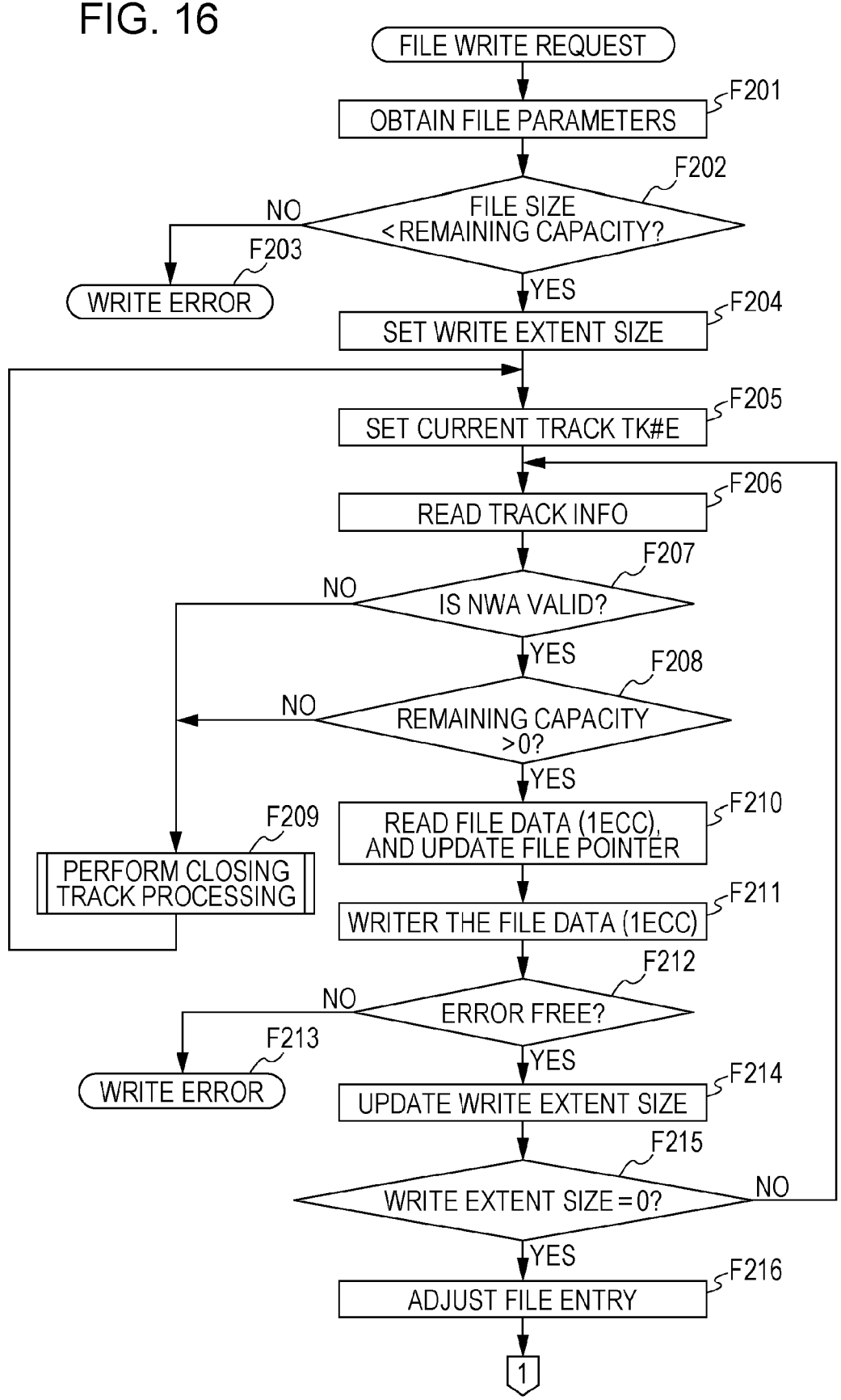
FIG. 16 is a flowchart of recording processing according to an embodiment.
Figure 17:
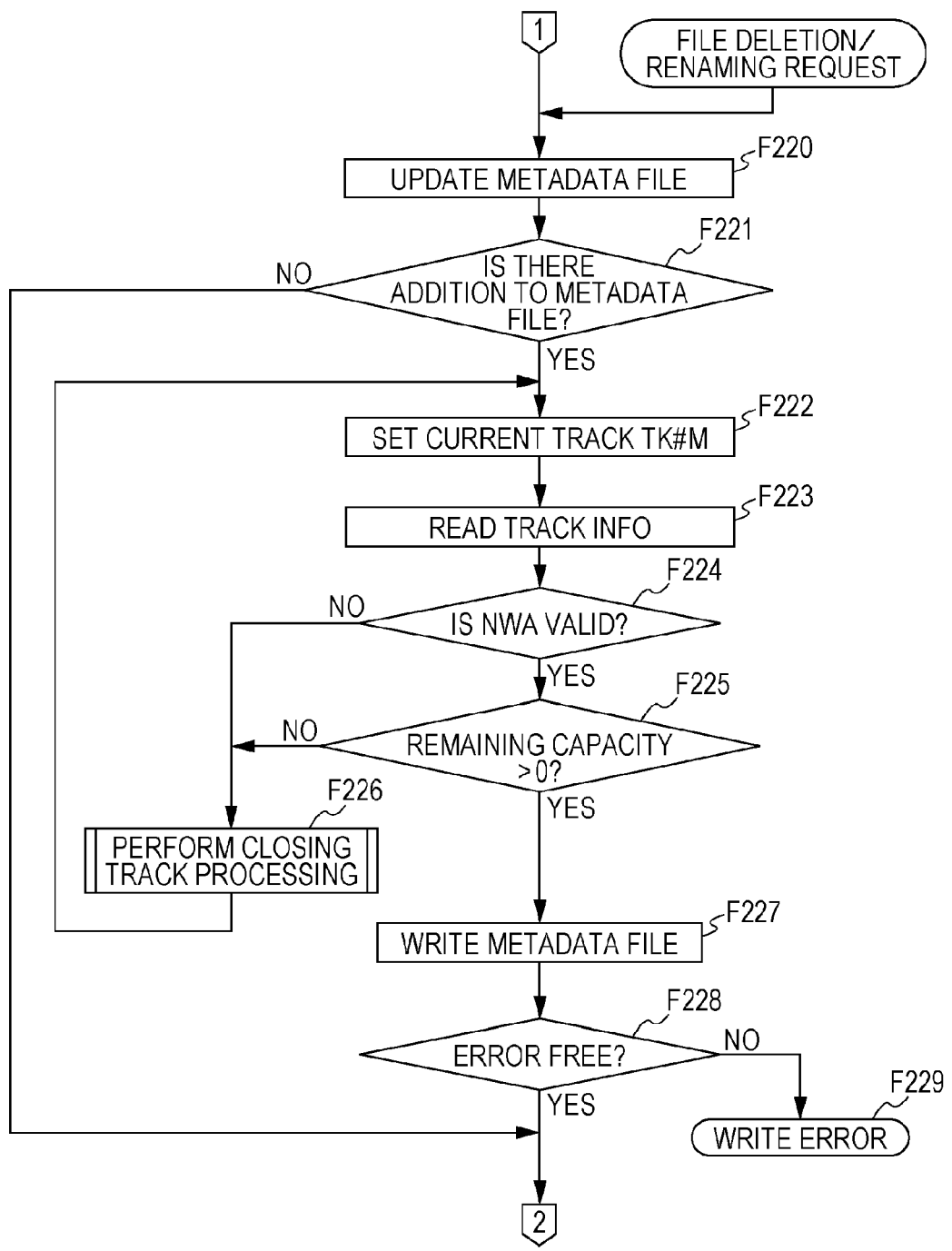
FIG. 17 is a flowchart of the recording processing according to an embodiment.

FIGS. 16, 17, and 18 illustrate processing of the drive control unit 101 in response to occurrence of a file write request command. Upon having received a file write request, in step F201 the drive control unit 101 obtains file parameters, and confirms the file size. Specifically, the drive control unit 101 determines whether or not a user data file requested this time is recordable for the remaining capacity of the multilayer recording medium 1. In the event the file size exceeds the remaining capacity, the drive control unit 101 proceeds from step F202 to F203, and takes this file size as a write error. In the event that the file size does not exceed the remaining capacity, the drive control unit 101 proceeds from step F202 to F204, and sets a write extent size. Specifically, the drive control unit 101 sets the value of the file size as a write extent size (data size to be consecutively recorded).

Next, in step F205, the drive control unit 101 sets the current track TK#E. The current track TK#E is specified as a track where recording will be performed from now on. For example, in the event of the state in FIG. 10B, the track TK#2 is set as the current track TK#E.

In step F206, the drive control unit 101 reads track information from the management information track TK#1 (or from the contents of the management information track TK#1 already read). In steps F207 and F208, the drive control unit 101 confirms regarding the current track TK#E (e.g., TK#2) whether or not the NWA is valid, or whether or not there is remaining capacity. The NWA is an address where sequential recording will be performed from now on, and in the event that the NWA is valid, recording has to be started from an address that the NWA thereof indicates. A case where the NWA is invalid is that the current track TK#E is in a state in which consecutive recording may not be performed for any reason. Also, with the current track TK#E thereof, in the event that the remaining capacity=0, recording may not be executed regarding the current track TK#E.

In the event that determination is made in steps F207 and F208 that the NWA is valid, and also, the remaining capacity=0, the drive control unit 101 proceeds to step F210, and performs recording processing of file data. Recording of file data is performed in increments of one ECC block, for example. Therefore, the drive control unit 101 reads out, for example, one ECC block worth of file data to be recorded in step F210 from the internal buffer or the like of the host apparatus 100, and supplies to the recording/reproducing unit 50 of the recorder/reproducer 10. Next, as step F211, the drive control unit 101 instructs the controller 44 to cause the recording/reproducing unit 50 to execute recording operation of one ECC block worth of the file data. Note that in step F210 the drive control unit 101 also performs, in order to record the next ECC block worth, updating of a file pointer that indicates the next ECC block within file data to be recorded.

In step F212, the drive control unit 101 confirms whether or not recording of this one ECC block worth has been executed without errors. In the event that an error has occurred, in step F213 the drive control unit 101 determines this recording to be a write error. In the event of error free, in step F214 the drive control unit 101 updates the write extent size. Specifically, the drive control unit 101 subtracts the size of one ECC block worth from the write extent size so that the write extent size indicates the remaining consecutive recording amount.

In step F215, the drive control unit 101 confirms whether or not the write extent size=0. As can be understood from the processing in step F214, the write extent size=0 indicates that recording of a user data file requested this time has been completed. Unless the write extent size=0, the drive control unit 101 proceeds to step F206 to confirm information of the current track TK#E. Specifically, the NWA and remaining capacity are confirmed, and in the event that these have no problem, the drive control unit 101 continuously performs recording processing of a user data file in increments of ECC blocks as steps F210 to F214.

In the event that confirmation is made in step F215 at a certain point-in-time that the write extent size=0, this means that recording of user data requested this time has been completed with the current track TK#E alone which has been set first (e.g., TK#2), and accordingly, the drive control unit 101 proceeds to updating of the management information (metadata and so forth) in step F216 and thereafter.

However, before recording of user data requested this time is completed, the current track TK#E may not be used any further. Specifically, examples of this case include a case where determination is made in step F207 that the NWA is invalid, and a case where determination is made in step F208 that the remaining capacity=0. In such a case, the drive control unit 101 performs the closing track processing in step F209.

An example of the closing track processing is illustrated in FIG. 19. First, in step F261 the drive control unit 101 confirms whether or not the current track TK#E is a track of the final layer, that is, in the event of a 6-layer disc, the front-most layer L5. In the event that the current track TK#E is a user data track of the final layer, recording may not be performed any further, and accordingly, in step F266 the controller 44 takes this as a write error. In the event that the current track TK#E is not included in the final layer, the drive control unit 101 proceeds to step F262 to perform close processing on the current track TK#E. Next, in step F263, the drive control unit 101 confirms whether or not track setting (setting of a management information track, a user data track, and a mirror track) has already been performed on the next layer toward the front side. In the event that track setting has not been performed, the drive control unit 101 proceeds to step F264 to set three tracks (a management information track, a user data track, and a mirror track) to the next layer, and ends the processing in FIG. 19.

Note that at the point-in-time in step F263, track setting has already been performed on the next layer, track setting does not have to be performed here. In this case, in step F265 the drive control unit 101 confirms whether or not the same type of track (user data track in this case) in the next layer is active (=not closed), and in the event of active, ends the processing in FIG. 19. In the event of not active, in step F266 the drive control unit 101 takes this as a write error.

The above-mentioned processing is processing in the case illustrated in FIG. 11A or FIG. 11B, for example. Specifically, in the case of FIG. 11A, with a recording process of user data, the user data track TK#2 has completely been used, and accordingly, in step F264 three tracks TK#4, TK#5, and TK#6 are set to the layer L1. Note that a case where the tracks have already been set in the next layer in step F263 is, for example, as illustrated in FIG. 12A, a case where the mirror track TK#9 in the layer L2 has completely been used, track setting has been performed on the layer L3, and at a point-in-time thereafter, the user data track TK#8 in the layer L2 has completely been used, and the drive control unit 101 has proceeded to step F263. In this case, the user data track TK#11 has already been set to the next layer L3.

Now, processing of track setting for the next layer to be performed in step F264 will be described. At the time of track setting, this processing is processing for obtaining data capacity per one layer, and performing track division using the value thereof. The data capacity mentioned here means capacity of an area which may be used as a track. The track division mentioned here means, for example, with the state in FIG. 10B, that from a state in which the track TK#3 is set immediately before of the track TK#4 in the layer L5, this track TK#3 is divided, and as illustrated in FIG. 11A, tracks TK#4, TK#5, and TK#6 are set to the layer L1.

Figure 20A:
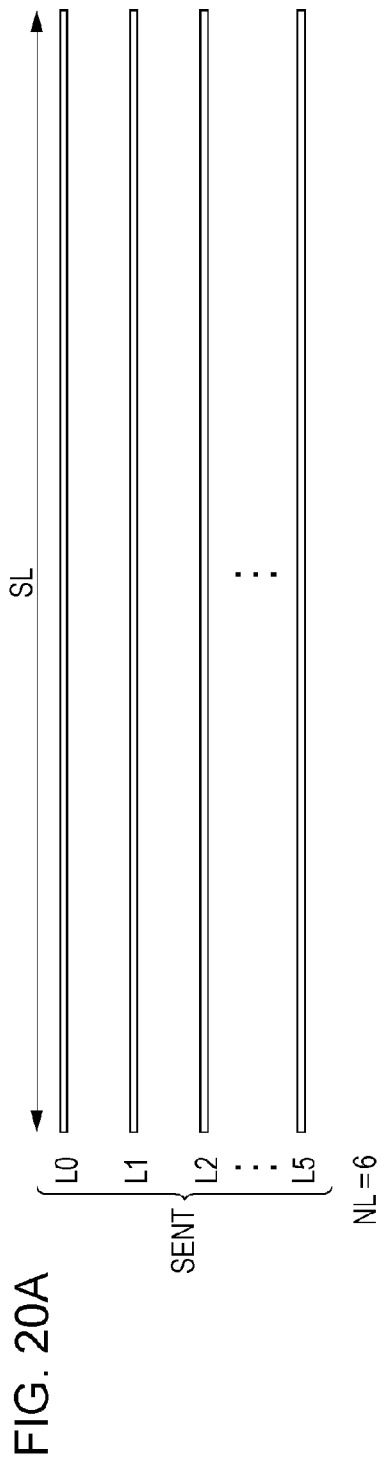
FIGS. 20A and 20B are explanatory diagrams of user data capacity acquisition per one layer according to an embodiment.
Figure 20B:
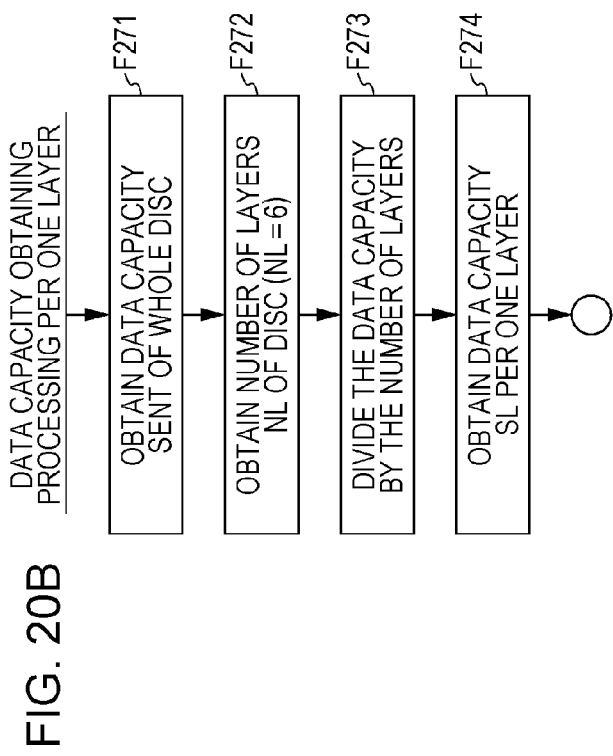

FIGS. 20A and 20B illustrate a technique for obtaining data capacity per one layer. As illustrated in FIG. 20A, let us say that the data capacity of the entire multilayer recording medium 1=SENT, the data capacity of one layer=SL, and the number of layers NL=6. FIG. 20B illustrates data capacity obtaining processing per one layer that the drive control unit 101 performs. In step F271, the drive control unit 101 obtains the data capacity SENT of the entire multilayer recording medium 1 from the controller 44. In step F272, the drive control unit 101 obtains the number of layers NL of the multilayer recording medium 1. The controller 44 may obtain these information from the management information of the multilayer recording medium 1. In step F273, the drive control unit 101 divides the data capacity SENT by the number of layers NL. Next, in step F274, the drive control unit 101 obtains the data capacity SL of one layer as a division result.

Figure 21A:
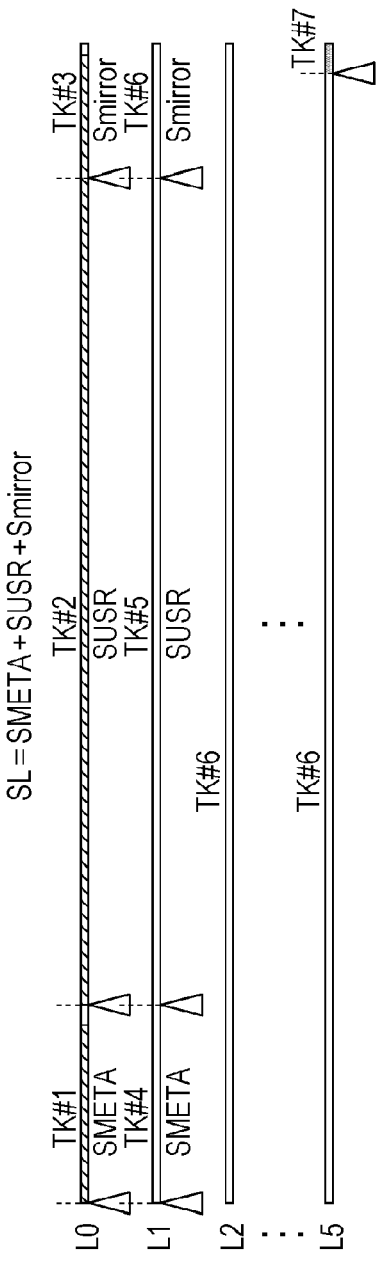
FIGS. 21A and 21B are explanatory diagrams of track division in increments of layers according to an embodiment.
Figure 21B:
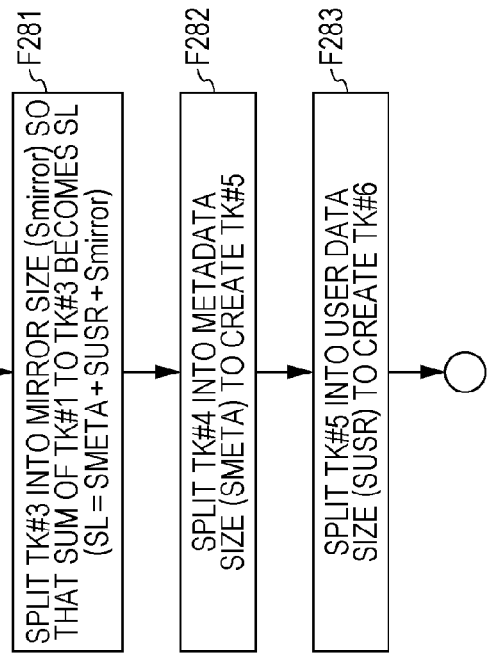

FIGS. 21A and 21B illustrate track division processing. As illustrated in FIG. 21A, for example, let us assume a case where at the time of the track TK#2 in the layer L0 being closed, the tracks TK#4, TK#5, and TK#6 are set to the layer L1. As illustrated in FIG. 21B, first, in step F281 the drive control unit 101 splits the track TK#3 so that summation of the capacities of the tracks TK#1, TK#2, and TK#3 is the data capacity SL of one layer. Specifically, the drive control unit 101 divides the mirror track TK#3 so as to satisfy SL=SMETA+SUSR+Smirror regarding capacity SMETA of a management information track TK#1, capacity SUSR of a user data track TK#2, and capacity Smirror of a mirror track TK#3. At this point-in-time, from the head and thereafter of the layer L2 becomes a track TK#4. Next, in step F282, the drive control unit 101 splits this track TK#4 with the capacity SMETA. Thus, the track TK#4 becomes a track having the same size as with the track TK#1 and also overlapped in the laser beam axial direction, and thereafter becomes a track TK#5. Next, in step F283, the drive control unit 101 splits this track TK#5 with the capacity SUSR. Thus, the track TK#5 becomes a track having the same size as with the track TK#2 and also overlapped in the laser beam axial direction, and thereafter becomes a track TK#6.

According to the above-mentioned processing, the tracks TK#4, TK#5, and TK#6 have been set to the layer L1. Note that a track which has been taken as the track TK#4 at first in layer L5 where recording of an AVDP is performed is postponed to become a track TK#7 in accordance with the above-mentioned track division. The case of the layer L1 has been described here, but in cases leading to FIGS. 11B, 12A, and 12B as well, similar track division processing will be performed, whereby tracks will be set.

Upon finishing the closing track processing (and track setting processing for the next layer) in FIG. 19, the drive control unit 101 returns to step F205 in FIG. 16 to set the current track TK#E. In this case, the user data track in the next layer which has newly been set (or has already been set) is taken as the current track TK#E. Next, recording of user data is executed on the current track TK#E for each one ECC block worth by the processing in steps F206 to F214.

In this manner, even in the event that a user data track has been closed in a certain layer, recording of user data may continuously be executed using a user data track in the next layer in a consecutive manner, and accordingly, the area of each layer is effectively used.

Upon recording of user data requested this time being completed after the write extent size becomes 0 in step F215, the drive control unit 101 proceeds to step F216 to perform adjustment of a file entry according to recording of user data of this time. Next, the drive control unit 101 proceeds to step F220 in FIG. 17 to perform updating of the contents of a metadata file according to modification of a file entry. In step F221, the drive control unit 101 determines whether or not additional writing onto the multilayer recording medium 1 of the metadata file has to be performed. For example, determination is made whether or not the contents of the metadata file has been changed, or whether or not this is actually timing for updating the metadata file on the multilayer recording medium 1, or the like. In the event that writing onto the multilayer recording medium 1 is not performed, the drive control unit 101 proceeds to FIG. 18.

In the event of writing the metadata file into the multilayer recording medium 1, the drive control unit 101 proceeds to step F222 to set the current track TK#M. The current track TK#M is specified as a track where recording of the management information (metadata file) is performed. For example, in the event of the state in FIG. 10B, the track TK#1 is set as the current track TK#M.

In step F223, the drive control unit 101 reads track information regarding the current track TK#M (e.g., management information track TK#1). In steps F224 and F225, confirmation is made regarding the current track TK#M whether or not the NWA is valid, and whether or not there is the remaining capacity.

Unless the NWA is valid, and also the remaining capacity=0, the drive control unit 101 proceeds to step F227 to perform recording processing of a metadata file to the current track TK#M. In step F228, the drive control unit 101 confirms whether or not recording of this metadata file has been executed without errors. In the event that an error has occurred, in step F229 the drive control unit 101 takes this recording as a write error. In the event of error free, the drive control unit 101 proceeds to processing in FIG. 18.

Here, determination may be made in step F224 that the NWA of the current track TK#M is invalid, or determination may be made in step F225 that the remaining capacity=0. In these cases, the drive control unit 101 performs closing track processing in step F226. The closing track processing is as described in FIG. 19. In this case, for example, in the event that the management information track TK#1 which is the current track TK#M has been closed, and track setting has not been performed on the next layer, three tracks (management information track, user data track, and mirror track) are set. In the event that the three tracks have already been set, track setting does not have to be performed. Next, the drive control unit 101 returns to step F222 in FIG. 17 to set the current track TK#M. In this case, a management information track (e.g., TK#4) in the next layer which has newly been set (or has already been set) is taken as the current track TK#M. Next, recording of the metadata file is executed on the current track TK#M by the processing in steps F223 to F228. In this manner, even when a management information track is closed in a certain layer, recording of the management information such a metadata file and so forth may continuously be executed using a management information track in the next layer in a consecutive manner.

Upon the processing regarding recording of a metadata file illustrated in FIG. 17 being completed, the drive control unit 101 proceeds to step F240 in FIG. 18. In the event that the above-mentioned addition of a metadata file has not been performed this time, the drive control unit 101 directly proceeds to step F248 to take this as completion of writing. In the event that recording of a metadata file which has been described in FIG. 17 has been performed, the drive control unit 101 subsequently performs writing of a metadata mirror file.

In the event of writing a metadata mirror file in the multilayer recording medium 1, the drive control unit 101 proceeds to step F241 to set the current track TK#MM. The current track TK#MM is specified as a track where recording of a metadata file mirror will be performed from now on. For example, in the event of the state in FIG. 10B, the track TK#3 is set as the current track TK#MM.

In step F242, the drive control unit 101 reads track information regarding the current track TK#MM (e.g., management information track TK#3). In steps F243 and F244, the drive control unit 101 confirms regarding the current track TK#MM whether or not the NWA is valid, and also whether or not there is the remaining capacity.

In the event that the NWA is valid, and also the remaining capacity=0, the drive control unit 101 proceeds to step F246 to perform recording processing of a metadata mirror file to the current track TK#MM. In step F247, the drive control unit 101 confirms whether or not recording of this metadata mirror file has been executed without errors. In the event that an error has occurred, in step F249 the drive control unit 101 takes this writing as a write error. In the event of error free, the drive control unit 101 proceeds to step F248 to end a series of control procedures regarding writing of user data.

In the event that determination is made in step F243 that the NWA of the current track TK#M is invalid, or determination is made in step F244 that the remaining capacity=0, the drive control unit 101 performs closing track processing in step F245. The closing track processing is as described in FIG. 19. In this case, for example, in the event that the mirror track TK#3 which is the current track TK#MM has been closed, and track setting has not been performed on the next layer, three tracks (management information track, user data track, and mirror track) are set. In the event that the three tracks have already been set, track setting does not have to be performed. Next, the drive control unit 101 returns to step F241 in FIG. 18 to set the current track TK#MM. In this case, a mirror track (e.g., TK#6) in the next layer which has newly been set (or has already been set) is taken as the current track TK#MM. Next, recording of the metadata mirror file is executed on the current track TK#MM by the processing in steps F242 to F247. In this manner, even when a mirror track is closed in a certain layer, recording of a metadata mirror file may continuously be executed using a mirror track in the next layer in a consecutive manner.

Note that the above-mentioned processing is processing according to a write request for user data, but in the event that a request command such as file deletion, renaming (change in a file name), or the like has occurred, rewriting (additional writing) of a management information file or mirror file is performed instead of recording of user data. In this case, step F220 and thereafter in FIG. 17 will be executed. Accordingly, a management information track or mirror track may be consumed without recording of user data, and as exemplified in FIG. 12A, a management information track or mirror track may be completely used in a certain layer prior to a user data track. In such a case as well, in the same way as described above, closing track processing, and three-track setting processing for the next layer are performed.

Figure 22:
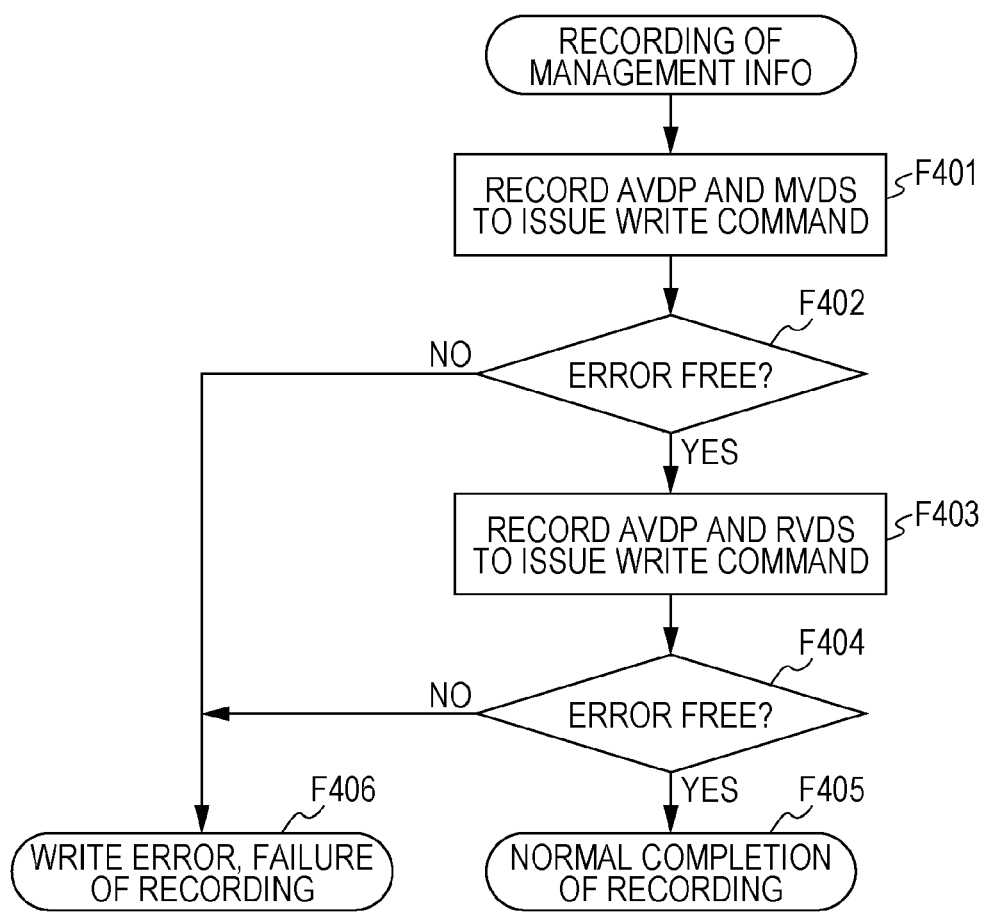
FIG. 22 is a flowchart of management information recording processing according to an embodiment.

Also, according to recording of data as described above, recording of the management information of an AVDP and so forth as exemplified in FIGS. 13A and 13B is also performed. FIG. 22 illustrates processing of the drive control unit 101 for recording of the management information. In step F401, the drive control unit 101 performs control (issuance of a write command) for instructing recording of an AVDP, MVDS, and so forth in a management information track (TK#1 or the like).

Note that the drive control unit 101 specifies LBA of the management information track TK#1, but in the case of FIG. 13A, the management information track TK#1 is opened, but the management information track TK#1 is closed in the case of FIG. 13B. Description of each case is as follows. In the case of the situation in FIG. 13A, the controller 44 of the recorder/reproducer 10 determines in step F304 in FIG. 15 that PSN≥NWA is not satisfied, and proceeds to step F313, where as processing of the second priority, tracks having the same radius are searched from the layer on the rear side, but in this case, the track TK#1 is in an opened state, and accordingly, the NWA1 of the track TK#1 thereof is taken as a sparing destination, and sparing recording of an AVDP and so forth is performed. On the other hand, in the case of the situation in FIG. 13B, the controller 44 of the recorder/reproducer 10 determines in step F303 in FIG. 15 that there is no NWA, and proceeds to step F313, where as processing of the second priority, tracks having the same radius are searched from the layer on the rear side, but in this case, the track TK#1 is closed, and the track TK#4 is in an opened state, and accordingly, the NWA4 of the track TK#4 thereof is taken as a sparing destination, and sparing recording of an AVDP and so forth is performed.

In step F402, the drive control unit 101 confirms an error of recording operation described above, and in the event of error free, in step F403 performs processing for recording an AVDP and an RVDS in a fixed management information track (track TK#7 in the case of FIGS. 13A and 13B), that is, performs issuance of a write command for the controller 44. In response to this, the controller 44 performs processing in FIG. 15. In this case, the fixed management information track (e.g., TK#7) has already been closed, and accordingly, an AVDP and an RVDS are recorded in another area by POW control (steps F313 to F319 and F307) on the controller 44 side. Specifically, the above-mentioned second priority sparing destination selection is performed, and in the event of FIG. 13B, the NWA6 of the track TK#6 in the layer L1 is selected as a sparing destination, and recording of an AVDP and an RVDS is performed.

Next, in step F404, the drive control unit 101 confirms an error of recording operation, and in the event of error free, in step F405 ends the processing as recording normal completion. Note that in the event that determination is made in step F402 or F404 that there is a write error, in step F406 the drive control unit 101 ends the processing as recording failure.

Note that an example has been illustrated wherein sparing processing is performed in the event of recording of the management information, but in the event that rewriting is performed regarding user data as well, sparing selection is similarly performed by the controller 44 using the processing in FIG. 15 in accordance with the first, second, and third priorities, and sparing recording is executed.

For example, the above-mentioned processing is performed as a specific processing example, whereby the above-mentioned advantages are realized. Specifically, there may be realized improvement in operation efficiency of recording of an AVDP and so forth for a fixed management information track, improvement in reliability of the management information, sequential recording using the layers and unwasted capacity use of the multilayer recording medium 1 owing thereto, assurance of data recording operation without being influenced by layers on the front side, and so forth.

5. Modifications

Though the embodiment has been described so far, various modifications and applications may be conceived regarding the present disclosed technology. Though the first, second, and third priorities serving as the sparing destination selecting algorithm have been described, the third priority may not be "the NWA of a track in an opened state first found after searching from the head of the volume space" as described above. For example, a track in an opened state near (ahead and behind of) a sparing source track is searched, and its NWA may be employed. Or, it may also be conceived that "the NWA of a track in an opened state first found after searching from the terminal of the volume space" is employed. This is because the third priority is used for maximally avoiding sparing incapable. Alternatively, it may also be conceived that in the event that a sparing destination has not been found by check of the first and second priorities, error processing is performed as sparing incapable without employing the third priority.

Also, though the second priority according to the embodiment has been defined as "the NWA of a track in an opened state first found after searching from the rear-most side of tracks overlapped in the layering direction of the layers", search may not necessarily be performed from the rear side. That is to say, "the NWA of any track overlapped in the layering direction of the layers" may be selected as a sparing destination, and it may also be conceived that search is performed from a track in an adjacent layer of a sparing source track, for example.

With the embodiment, though three tracks according to a recording purpose have been set to one layer, two or four or more tracks may be set depending on an employed file system, management information format, or the like. A multi-session configuration may also be employed.

Also, with a processing example of the embodiment, though description has been made assuming that the drive control unit 101 performs the track setting processing, closing track processing, and so forth, these processes are realized as a program for controlling a central processing unit in the host apparatus 100. For example, these processes may be realized by software serving as a device driver for the recorder/reproducer 10. Also, the controller 44 of the recorder/reproducer 10 may perform the track setting processing and closing track processing instead of the host apparatus 100 side. In this case, the controller 44 (central processing unit) has to operate based on a program serving as firmware causing the controller 44.

Such a program may be recorded in an HDD serving as a recording medium housed in a device such as a computer device or the like, ROM within a microcomputer including a CPU, or the like beforehand. Alternatively, such a program may temporarily or permanently be stored (recorded) in a removable recording medium such as a flexible disk, CD-ROM (Compact Disc Read Only Memory), an MO (Magnet optical) disk, DVD, Blu-ray Disc (registered trademark), a magnetic disk, semiconductor memory, a memory card, or the like. Such a removable recording medium may be provided as so-called package software. Also, such a program may not only be installed into a personal computer or the like from a removable recording medium but also be downloaded from a download site via a network such as a LAN (Local Area Network), the Internet, or the like.

Also, the multilayer recording medium 1 and recorder/reproducer 10 according to the embodiment are just an example. The configuration of the multilayer recording medium 1 and the configuration of the recorder/reproducer 10 may variously be conceived. Also, the multilayer recording medium 1 serving as an optical disc has been illustrated as an example, but a recording medium to which the present disclosed technology may be applied is not restricted to an optical-disc-shaped recording medium. For example, the present disclosed technology may also be applied to a card-shaped recording medium, or a recording apparatus corresponding thereto.

Note that the present technology may assume the following configurations.
(1) A recording apparatus including: a recording unit configured to perform recording of information by laser irradiation on a recording medium having a plurality of layers serving as recording layers where recording of information is performed by laser irradiation, and a track serving as a continuous recording area is formed in the plurality of layers, and recording of data is performed within a track, and also a plurality of tracks are set to one layer according to recording purpose; and a control unit configured to determine a sparing destination by sparing destination selecting processing where recording of information by the recording unit is executed on a recording position on the recording medium specified according to a recording request, and also in the event that sparing processing occurs, as a first priority the next recording address of a track being recorded is selected as a sparing destination, and as a second priority the next recording address of a track overlapped with a track where recording is performed according to the recording request in a layering direction of the layers is selected as a sparing destination, and to cause the recording unit to execute sparing recording.

(2) The recording apparatus according to (1), wherein the control unit searches, of tracks overlapped with a track where recording is performed according to the recording request, in a layering direction of the layers, from the rear-most layer as viewed from a laser beam entry face side, and selects as the second priority the next recording address of a track in an opened state first found, as a sparing destination.

(3) The recording apparatus according to (1) or (2), wherein of a plurality of tracks according to recording purpose set in each layer, tracks of the same recording purpose are set so as to be overlapped in a layer layering direction; and wherein a track including a sparing destination selected as the second priority is a track of the same recording purpose as with a track including a sparing source.

(4) The recording apparatus according to (3), wherein, with the layers of the recording medium, there are set at least a management information track of which the recording purpose is to record management information, a user data track of which the recording purpose is to record user data, and a mirror track of which the recording purpose is to record mirror data of the management information.

(5) The recording apparatus according to any of (1) to (4), wherein as a third priority in the sparing destination selecting processing the control unit selects the next recording address of a track in an opened state first found by searching from the head of volume space as a sparing destination.

The present disclosure contains subject matter related to that disclosed in Japanese Priority Patent Application JP 2012-140792 filed in the Japan Patent Office on Jun. 22, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
a recording unit configured to perform recording of information by laser irradiation on a recording medium having a plurality of layers serving as recording layers where recording of information is performed by laser irradiation, and a track serving as a continuous recording area is formed in the plurality of layers and recording of data is performed within a track, and also a plurality of tracks are set to one layer according to recording purpose; and
a control unit configured to determine a sparing destination by sparing destination selecting processing where recording of information by the recording unit is executed on a recording position on the recording medium specified according to a recording request, and also in the event that sparing processing occurs, as a first priority the next recording address of a track being recorded is selected as a sparing destination, and as a second priority the next recording address of a track overlapped with a track where recording is performed according to the recording request in a layering direction of the layers is selected as a sparing destination, and to cause the recording unit to execute sparing recording.

2. The recording apparatus according to claim 1, wherein the control unit searches, of tracks overlapped with a track where recording is performed according to the recording request, in a layering direction of the layers, from the rear-most layer as viewed from a laser beam entry face side, and selects as the second priority the next recording address of a track in an opened state first found, as a sparing destination.

3. The recording apparatus according to claim 1, wherein of a plurality of tracks according to recording purpose set in each layer, tracks of the same recording purpose are set so as to be overlapped in a layer layering direction;
and wherein a track including a sparing destination selected as the second priority is a track of the same recording purpose as with a track including a sparing source.

4. The recording apparatus according to claim 3, wherein, with the layers of the recording medium, there are set at least a management information track of which the recording purpose is to record management information, a user data track of which the recording purpose is to record user data, and a mirror track of which the recording purpose is to record mirror data of the management information.

5. The recording apparatus according to claim 1, wherein as a third priority in the sparing destination selecting processing the control unit selects the next recording address of a track in an opened state first found by searching from the head of volume space as a sparing destination.

6. A recording method comprising:
executing recording of information by laser irradiation on a recording position specified according to a recording request on a recording medium having a plurality of layers serving as recording layers where recording of information is performed by laser irradiation, and a track serving as a continuous recording area is formed, and recording of data is performed within a track, and also a plurality of tracks are set to one layer according to recording purpose; and
determining, in the event that sparing processing occurs, a sparing destination by sparing destination selecting processing where as a first priority the next recording address of a track being recorded is selected as a sparing destination, and as a second priority the next recording address of a track overlapped with a track where recording is performed according to the recording request in a layering direction of the layers is selected as a sparing destination, and sparing recording is executed.

7. A sparing destination selecting method in a case where sparing processing of a recording position occurs on a recording medium having a plurality of layers serving as recording layers where recording of information is performed by laser irradiation, and a track serving as a continuous recording area is formed in the plurality of layers, and recording of data is performed within a track, and also a plurality of tracks are set to one layer according to recording purpose, the method comprising:

selecting, as a first priority, the next recording address of a track being recorded as a sparing destination; and selecting, as a second priority, the next recording address of a track overlapped with a track where recording is performed according to the recording request in a layering direction of the layers as a sparing destination.

* * * * *